US012680847B1

(12) United States Patent
Sidhom

(10) Patent No.: US 12,680,847 B1
(45) Date of Patent: Jul. 14, 2026

(54) FLOW MEASUREMENT AND CONTROL DEVICE AND ASSOCIATED METHOD

(71) Applicant: Samir Alexander Sidhom, Minneapolis, MN (US)

(72) Inventor: Samir Alexander Sidhom, Minneapolis, MN (US)

( * ) Notice: Subject to any disclaimer, the term of this patent is extended or adjusted under 35 U.S.C. 154(b) by 0 days.

(21) Appl. No.: 19/391,387

(22) Filed: Nov. 17, 2025

Related U.S. Application Data

(60) Provisional application No. 63/874,475, filed on Sep. 2, 2025.

(51) Int. Cl.
G01F 1/44 (2006.01)

(52) U.S. Cl.
CPC ...................................... G01F 1/44 (2013.01)

(58) Field of Classification Search
None
See application file for complete search history.

(56) References Cited

U.S. PATENT DOCUMENTS

| | | | | | | |
|---|---|---|---|---|---|---|
| 2,704,555 | A | * | 3/1955 | Dall | ........................... | G01F 1/44 |
| | | | | | | 138/44 |
| 4,516,434 | A | * | 5/1985 | Halmi | ........................ | G01F 1/44 |
| | | | | | | 73/861.64 |

| | | | | | | |
|---|---|---|---|---|---|---|
| 5,127,173 | A | * | 7/1992 | Thurston | .................... | G01F 1/44 |
| | | | | | | 73/202 |
| 9,255,721 | B2 | | 2/2016 | Donohue | | |
| RE48,081 | E | | 7/2020 | Donohue | | |
| 12,234,778 | B2 | * | 2/2025 | Murray | ................... | F02C 9/263 |
| 2022/0155112 | A1 | * | 5/2022 | Bar | .......................... | G01F 1/363 |
| 2023/0105634 | A1 | * | 4/2023 | Brown | ....................... | G01F 1/44 |
| | | | | | | 73/861.04 |

FOREIGN PATENT DOCUMENTS

| | | | | | | |
|---|---|---|---|---|---|---|
| CA | 2264848 | C | * | 5/2005 | ............. | G01F 7/005 |
| GB | 2335494 | A | * | 9/1999 | ............... | G01F 1/44 |

* cited by examiner

*Primary Examiner* — Daniel S Larkin

(74) *Attorney, Agent, or Firm* — Westman, Champlin & Kochler, P.A.

(57) ABSTRACT

A fluid flow device includes a body with an internal flow path that expands then contracts, the internal flow path having an inlet, a first region having a first cross-sectional area (A1), a second region having a second cross-sectional area (A2), a third region having a third cross-sectional area (A3), and an outlet, where A2>A1, and where a minimum cross-sectional area (Amin) of the internal flow path between the inlet and the outlet is equal to or greater than $AR \cdot A1$, with $AR \geq 0.70$. A high-pressure manifold fluidically connects to the internal flow path at the second cross-sectional area (A2), a first low-pressure manifold fluidically connects to the internal flow path at the first cross-sectional area (A1) and/or at the third cross-sectional area (A3), and a first sensor is operatively connected to the high-pressure and first low-pressure manifolds to sense a pressure differential.

27 Claims, 15 Drawing Sheets

DETAIL

DETAIL

DETAIL

500

500

FLOW MEASUREMENT AND CONTROL DEVICE AND ASSOCIATED METHOD

CROSS-REFERENCE TO RELATED APPLICATION(S)

The present application is based on and claims the benefit of U.S. provisional patent application Ser. No. 63/874,475, filed Sep. 2, 2025.

FIELD

The present disclosure relates to fluid flow measurement and control and methods of making and using the same.

BACKGROUND

There are many applications where an air-valve device is provided within an HVAC duct system to control or regulate the flow of conditioned air. Such valves are used in the supply and exhaust ducting of residential, commercial, industrial, and critical environments—including laboratories, healthcare facilities, classrooms, and other occupied spaces—to deliver air that has been heated, cooled, filtered, or otherwise conditioned, or exhaust air that has been used or contaminated. The airflow through these valves is typically adjusted to maintain desired room temperatures, pressurization levels, or air-change rates, forming part of the overall environmental-control system. Accurate airflow measurement and control are therefore essential for maintaining proper system balance, user comfort, occupant safety, and isolation control. To achieve these functions, a variety of airflow-sensing and control devices have been developed.

Airflow-sensing devices, such as crossflow averaging stations, pitot tubes, hot-wire anemometers, and valves using vortex-shedding, mechanical spring actuated cone, and Venturis are known in the art. These devices may exhibit one or more limitations such as static-pressure loss, restricted flow range, or susceptibility to fouling and calibration drift.

Venturi-type airflow valves are commonly used in HVAC systems for measuring and regulating airflow. Their operation is based on Bernoulli's principle, in which air passing through a narrowed throat increases in velocity and decreases in static pressure, producing a differential pressure proportional to volumetric flow. When used with a properly calibrated differential-pressure transducer, such valves are known to provide measurement accuracy of approximately ±0.5% of reading and, under controlled conditions, as low as ±0.25%.

As illustrated in FIG. 10, a representative prior art Venturi valve (300) includes a throat constriction (C) located between an upstream pressure port (301) and a downstream pressure port (304). The manometer (800) shown is shown only to depict this relationship and is not part of the operational device. The pressure difference (represented schematically at 807) between these ports (301 and 304) corresponds to the airflow rate.

The throat restriction (C), while necessary to generate a measurable differential pressure, reduces the effective flow area (D1) relative to the inlet and outlet diameters (D2). Commercial embodiments of Venturi-valve technology typically reduce the inlet area by about 58% to 51%, retaining only 42% to 49% of the original cross-section.

According to ISO 5167-4:2022, which defines the geometry and discharge coefficients for Venturi tubes used in differential-pressure flow measurement, the throat diameter ratio β=d/D—representing the ratio of the throat diameter d to the upstream pipe diameter D—typically ranges from 0.30 to 0.75, depending on construction type. This corresponds to an effective flow-area reduction of approximately 44% to 91% relative to the upstream cross-sectional area. This constriction limits maximum airflow capacity and introduces a pressure loss that cannot be fully recovered in the downstream expansion.

As illustrated in FIG. 11, the static-pressure loss associated with a Venturi-type airflow valve can be measured between an upstream tap (402) in the supply duct (400) and a downstream tap (403) in the return duct (401) across the valve body (300). The throat (C) accelerates the airflow and lowers static pressure, while the expansion section (R) slows the flow and partially restores static pressure. The remaining differential represents the permanent pressure drop inherent to the flow path geometry. For clarity, FIG. 11 depicts a manometer across the taps; in practice, any suitable differential-pressure instrument may be used.

This constriction typically reduces the effective flow area by 44%-84%, producing a sustained pressure drop that the system fan must overcome. For example, while a 6-inch duct can theoretically deliver about 1,100 CFM at 2 inches of water column, as calculated in the equations below, an equivalent 6-inch Venturi valve may yield only 54% of this flow which equates to ~600 CFM, requiring larger valves and ductwork to maintain design flow. In aggregate, such losses across multiple Venturi valves increase fan energy demand and limit total airflow capacity.

$$V_{fpm} \approx 4005\sqrt{\Delta P_{vp}} \text{ (in. } w.c.)$$

$$Q_{cfm} = V_{fpm} \times A_{ft2}$$

$$V \approx 4005\sqrt{2.0} \approx 4005 \times 1.414 \approx 5660 \text{ fpm}$$

$$Q \approx 5660 \times 0.196 \approx 1110 \text{ cfm}$$

$V$ = velocity in feet per minute (fmp)

$\Delta P_{vp}$ = velocity pressure in inches of water column (in. $w.c.$)

4005 = conversion factor derived from standard air density $\left(0.075 \text{ lb}/\text{ft}^3 \text{ at sea level, } 70° \text{ F.}\right)$ To summarize, known Venturi-type valves are known for accuracy, stability, and predictable flow performance but inherently impose static-pressure penalties that increase fan energy requirements and constrain overall system capacity. These effects, combined with restricted turndown range, and higher material and installation costs due to valve and duct upsizing, compound at the facility scale into greater energy consumption over the lifetime of the valve and higher lifecycle cost. In view of those factors, it is desired to provide an alternative valve architecture that permits accurate and stable airflow measurement while reducing both operational and material costs.

SUMMARY

In one aspect of the present invention, a fluid flow device can include a body with an internal flow path that expands then contracts in a direction of fluid flow, the internal flow path having an inlet, a first region having a first cross-sectional area (A1), a second region having a second cross-sectional area (A2), a third region having a third cross-sectional area (A3), and an outlet, where the first, second, and third regions are each located in between the inlet and the outlet, where A2>A1, and where a minimum cross-sectional area (Amin) of the internal flow path between the inlet and the outlet is equal to or greater than AR·A1, with AR≥0.70. A high-pressure manifold can be fluidically connected to the internal flow path at the second cross-sectional area (A2), a first low-pressure manifold can be fluidically connected to the internal flow path at the first cross-sectional area (A1), at the third cross-sectional area (A3), or at both the first and third cross-sectional areas (A1 and A3), and a first sensor can be operatively connected to the high-pressure manifold and the first low-pressure manifold, the first sensor configured to sense a pressure differential.

In another aspect, a method of operating a fluid flow device can include moving a fluid through an internal flow path that expands and then contracts in a direction of fluid flow, the internal flow path having a first cross-sectional area (A1) at a first position, a second cross-sectional area (A2) at a second position, and a third cross-sectional area (A3) at a third position, where the first, second, and third positions are at different locations along the internal flow path, where A2>A1, and where A3 is equal to or greater than AR·A1, with AR≥0.70. The method can further include measuring a pressure differential between a high-pressure manifold and at least one low-pressure manifold, where the high-pressure manifold is fluidically connected to the internal flow path at the second cross-sectional area (A2), and where the at least one low-pressure manifold is fluidically connected to the internal flow path at the first cross-sectional area (A1), at the third cross-sectional area (A3), or at both the first and third cross-sectional areas (A1 and A3).

In another aspect, a fluid flow device can include a body establishing an internal flow path that varies in cross-sectional area between an inlet and an outlet, a first low-pressure manifold fluidically connected to the internal flow path in between the inlet and the outlet, a high-pressure manifold fluidically connected to the internal flow path in between the inlet and the outlet such that the high-pressure manifold and the first low-pressure manifold accept fluid at different positions along the internal flow path in a direction of fluid flow, and a first sensor operatively connected to the high-pressure manifold and to the first low-pressure manifold, the first sensor configured to sense a pressure differential. The high-pressure manifold, the first low-pressure manifold, or both the high-pressure manifold and the first low-pressure manifold can include a channel open to the internal flow path along at least a portion of a perimeter of the internal flow path.

In yet another aspect, a fluid flow assembly can include a body with an internal flow path that expands then contracts in a direction of fluid flow, the internal flow path having an inlet, a first region located downstream of the inlet and having a first cross-sectional area (A1), a second region located downstream of the first region and having a second cross-sectional area (A2), a third region located downstream of the second region having a third cross-sectional area (A3), and an outlet located downstream of the third region, where A2>A1, and where a minimum cross-sectional area (Amin) of the internal flow path between the inlet and the outlet satisfies the relationship Amin≈A1≈A3. The fluid flow assembly can further include a high-pressure manifold fluidically connected to the internal flow path at the second cross-sectional area (A2), a first low-pressure manifold fluidically connected to the internal flow path such that the first low-pressure manifold is located at or adjacent to a perimeter of the first cross-sectional area (A1), a second low-pressure manifold fluidically connected to the internal flow path such that the second low-pressure manifold is located at or adjacent to a perimeter of the third cross-sectional area (A3), a first transducer operatively connected to the high-pressure manifold and to at least one of the first low-pressure manifold and the second low-pressure manifold, with the first transducer configured to sense a pressure differential, a damper positioned in the internal flow path, and a controller operatively coupled to the first transducer and the damper, the controller configured to regulate a position of the damper in response to the sensed pressure differential to control volumetric flow.

The present summary is provided only by way of example, and not limitation. Other aspects of the present invention will be appreciated in view of the entirety of the present disclosure, including the entire text, claims, and accompanying figures.

BRIEF DESCRIPTION OF THE DRAWINGS

FIG. 2AA is an enlarged detail view of a portion of FIG. 2A.

FIG. 2BA is an enlarged detail view of a portion of FIG. 2B.

FIG. 2CA is an enlarged detail view of a portion of FIG. 2C.

Figure 1A:
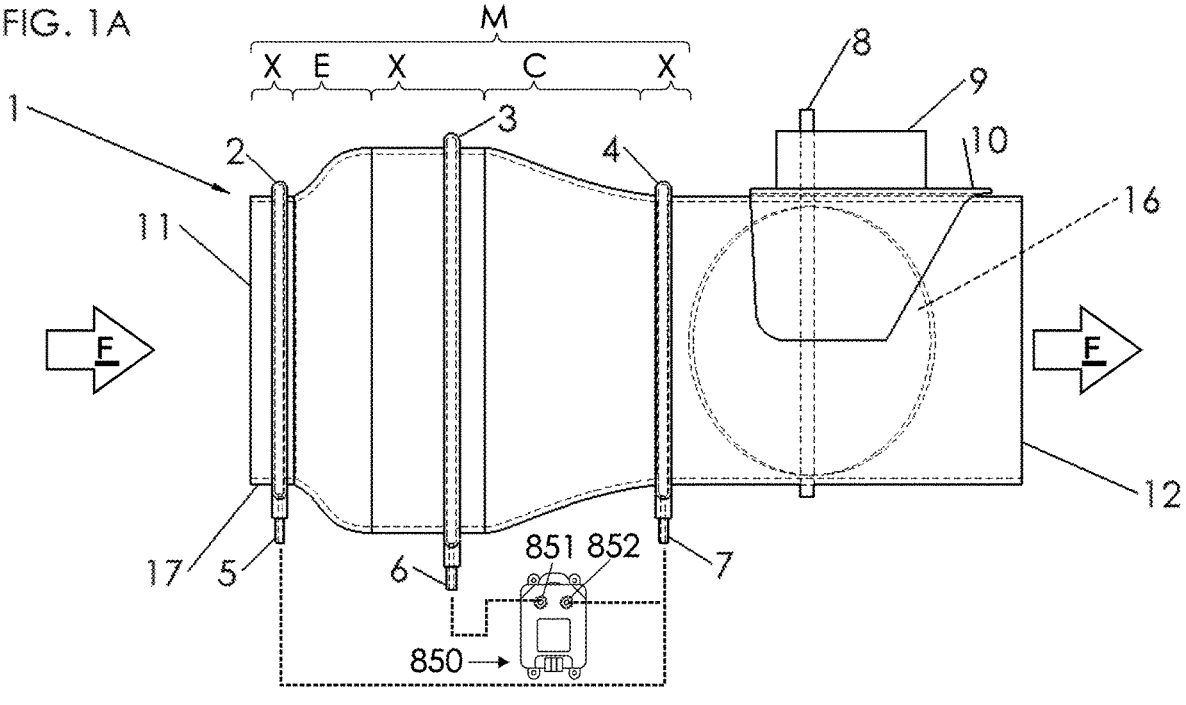
FIG. 1A is a side elevation view of an embodiment of a fluid flow measurement device.

While the above-identified figures set forth embodiments of the present invention, other embodiments are also contemplated as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or components not specifically shown in the drawings.

DETAILED DESCRIPTION OF ILLUSTRATIVE EMBODIMENTS

In general, disclosed embodiments of the present invention provide a fluid flow measurement device, and associated method, in which a fluid flow can be first expanded to increase cross-sectional area and then reconverged through a contraction. This arrangement creates multiple regions or zones of differential pressure along the flow path (in the direction of fluid flow) that may be sampled individually, averaged, or used in combination to determine volumetric flow at one or more of those zones with stability and accuracy. Such measurements can then, in turn, be utilized by a controller, for example, to control a damper as a function of measured volumetric flow. By avoiding excessive constriction, disclosed embodiments of the device can help reduce or minimize permanent static pressure loss while substantially preserving duct capacity and reducing energy requirements (e.g., for fan(s) used to move fluid along the flow path). As a result, it can provide accurate and stable measurement while maintaining duct capacity and reducing energy losses. Disclosed embodiments do not require probes or other elements projecting into the flow stream, and manifolds, ports, openings, and apertures can be substantially flush with or recessed relative to a perimeter of the flow path as defined by a body, wall, duct, or the like. These and other features and benefits will be appreciated by persons of ordinary skill in the art in view of the entirety of the present disclosure, including the accompanying drawings.

Figure 1B:
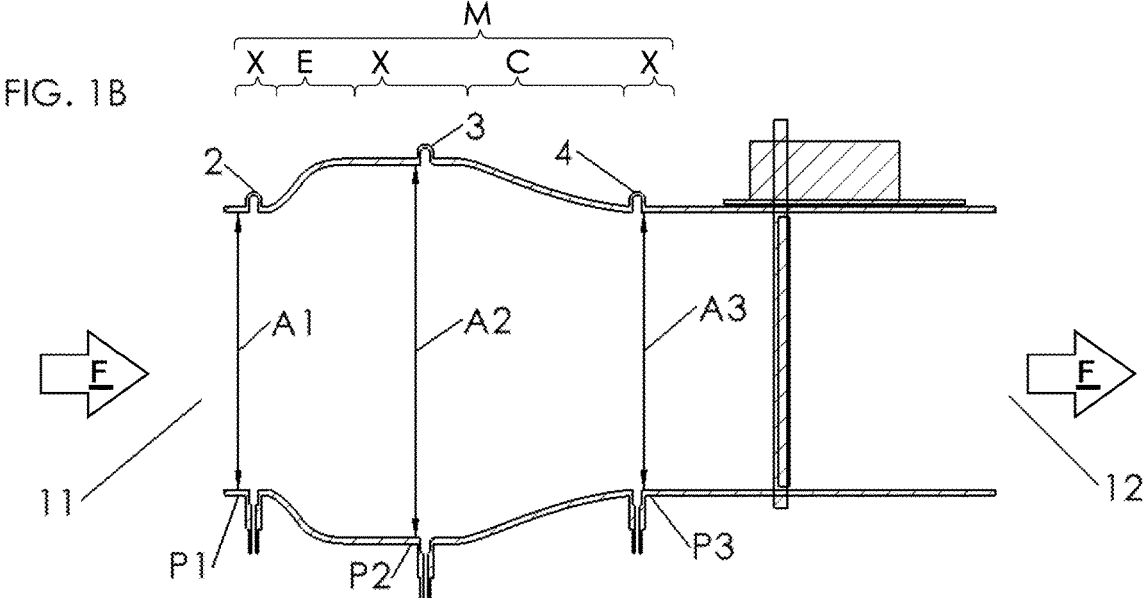
FIG. 1B is a cross-sectional view of the fluid flow measurement device, with structures that would otherwise be visible beyond the section plane omitted for simplicity.

FIGS. 1A and 1B illustrate a side-elevation and cross section view of an embodiment of a fluid-flow measurement device (1) having a body (17) with an inlet (11) and an outlet (12). A working fluid can enter the inlet (11) and exit the outlet (12) along an internal flow path (F). The inlet (11) and the outlet (12) can be fluidically connected to additional ducts or the like (not shown) as desired for particular applications. The internal flow path (F) of the illustrated embodiment includes at least one measurement zone (M) that includes an expansion zone (E) that increases area from an upstream position (P1) having an area (A1) to a middle position (P2) having an area (A2), followed in a direction of flow of the internal flow path (F) by a converging (or contraction) zone (C) that reduces area toward a downstream position (P3) having an area (A3). In some embodiments, one or more substantially constant-area plateau regions (X) can be provided in the measurement zone (M), such as between the expansion zone (E) and the converging zone (C), between the inlet (11) and the expansion zone (E), and/or between the converging zone (C) and the outlet (12), which can help stabilize pressure sensing. In the illustrated embodiment, the manifold (3) is located within a middle portion of the plateau (X) located between the expansion zone (E) and the converging zone (C) and the manifolds (2 and 4) are located in additional plateaus (X) adjoining the expansion zone (E) and the converging zone (C) at respective upstream and downstream locations. The direction of flow of the fluid can be established by one or more fan(s) (not shown). The fluid can be any fluid, including a gas such as air, a liquid such as water, or a gas with entrained liquid droplets.

The areas (A1-A3) can be measured perpendicular to the flow direction of the internal flow path (F). The internal flow path (F) at or near the inlet (11) (e.g., immediately downstream of the inlet (11) and/or immediately upstream of the area (A1)) can have a substantially constant area, which in some embodiments can be substantially equal to the area (A1). The internal flow path (F) at or near the outlet (12) (e.g., immediately upstream of the outlet (12) and/or immediately downstream of the area (A3)) can have a substantially constant area, which in some embodiments can be substantially equal to the area (A3). In the illustrated embodiment, area (A2)>area (A1) and area (A2)>area (A3). The downstream area (A3) can be smaller than the inlet area (A1) but not by more than approximately thirty percent, such that $A3 \geq 0.70 \cdot A1$. A minimum area (Amin) between the inlet (11) and outlet (12) can, in some embodiments, satisfy the relationship $Amin \geq AR \cdot (A1)$, where, for example, $AR \geq 0.70$ or $AR \approx 1$. For example, in an embodiment where the area A3 is the minimum area (Amin), then $A3 \geq AR \cdot (A1)$, where $AR \geq 0.70$. In some embodiments, $A1 \approx A3 \approx Amin$.

In contrast to conventional single-zone Venturi-type devices, the measurement zone (M) of the illustrated embodiment includes two discrete measurement zones—one located within the expansion zone (E) and another within the converging zone (C). Each zone defines a distinct pressure-sensing region that can be independently sampled or differentially compared to derive flow characteristics. This dual-zone arrangement allows the device (1) to characterize both the rise and fall of static pressure within the same structure, providing additional measurement fidelity and diagnostic flexibility without altering the overall flow sequence or geometry described above.

As the working fluid moves through the internal flow path (F), it enters region (P1) at the inlet (11), expands through the expansion zone (E) to region (P2), and then contracts through the converging zone (C) to region (P3) near the outlet (12). Each of these regions corresponds respectively to manifolds (2-4), which can sample local static pressure at areas (A1-A3). The measured pressures can then be transmitted through ports (5-7) for differential-pressure measurement as described below. In the illustrated embodiment, the port (5) is fluidically connected to the manifold (2), the port (6) is fluidically connected to the manifold (3), and the port (7) is fluidically connected to the manifold (4). Moreover, in the illustrated embodiment, the ports (5 and 7) and the manifolds (2 and 4) are low pressure ports and manifolds, and the port (6) is a high-pressure port and the manifold (3) is a high-pressure manifold.

A differential pressure transducer or sensor (850) can have a high-pressure port or connection (851) and a low-pressure port or connection (852). In some embodiments, the high-pressure port (851) can be connected to port (6) and the low-pressure port (852) can be connected to either port (5) or (7), or to a composite formed by averaging pressures from ports (5) and (7) as depicted in FIG. 1A. As illustrated, the ports (5) and (7) are connected together to form a composite low-pressure signal delivered to the low-pressure port (852). The fluid connections are shown schematically and can be formed using flexible pneumatic tubing or other suitable tube or conduit structure(s). A composite average of the ports (5 and 7) can be provided fluidically (e.g., pneumatically) by fluidically coupling their corresponding tubes or the like with a t-fitting or other manifold for delivery to the low-pressure portion (852) with a common delivery tube or the like. This configuration enables the transducer (850) to measure the differential pressure AP across selected regions of the flow path (F), which can be correlated to the instantaneous volumetric flow (Q). Accordingly, differential-pressure measurements can be obtained between any combination of the defined sensing regions, including between (A2, A3), (A2, A1), or a composite of (A2, A1⊕A3). In some embodiments, ports can be present in the device (1) that are unused, or sealed off, or alternatively ports that are not needed for desired measurements can be omitted entirely. The transducer (850) can have an output interface to output a differential pressure measurement or signal, such as to transmit an electronic signal to another component or device.

In some embodiments, two transducers (850) can be used to independently monitor separate portions of the flow path (F). For example, a first transducer can measure the pressure rise between ports (5) and (6), while a second transducer measures the pressure drop between ports (6) and (7). These signals can be processed individually or combined to provide enhanced flow resolution, noise/turbulence rejection, or redundancy. Although a single transducer (850) is illustrated, any number of transducers can be implemented to measure differential pressures across one or more of the defined sensing positions (P1-P3).

Pressure sampling can be achieved using annular or discrete pickup configurations that are flush or recessed relative to the internal surface of the flow path (F), minimizing protrusions that could disrupt laminar flow or collect debris. The internal flow path (F) can have a circular, rectangular (including square and non-square shapes), non-circular elliptical, oval/elliptical, polygonal (including irregular polygonal shapes), obround, asymmetric or non-axisymmetric, or other cross-section, and equivalent geometric relationships can be defined in terms of area (A) or hydraulic diameter (Dh). Different regions of the internal flow path (F) along the flow direction can have different perimeter shapes in some embodiments. For example, in some embodiments the internal flow path can include transitions between circular and rectangular perimeter shapes along the flow direction, such as between any of the areas (A1, A2, and/or A3).

In some embodiments, a damper (16), such as a blade mounted on a shaft (8) in a butterfly valve configuration, can be actuated (e.g., rotated) by an actuator (9) supported by a mount (10). In further embodiments, the damper (16) can be configured as a sliding plate damper, a flapper, an iris-type damper, a proportional valve, or have any other suitable configuration. The actuator (9) can include or be communicatively coupled to a controller configured to receive a differential-pressure signal from the transducer (850), determine a corresponding flow rate, and adjust the damper (16) to regulate airflow and room pressurization. The controller can implement proportional, integral, or model-based control logic to maintain a target flow or pressure setpoint. Although the damper assembly and controller can enhance automation, the device (1) can also operate in passive or manually adjusted configurations where such control elements are omitted.

The device (1) provides two measurement zones within a single flow passage that enable accurate differential-pressure sensing with minimal to no permanent pressure loss. The example geometry shown demonstrates how expansion followed by contraction in sequential measurement zones allows precise, energy-efficient flow measurement distinct from conventional single-zone Venturi and other existing devices.

Figure 1C:
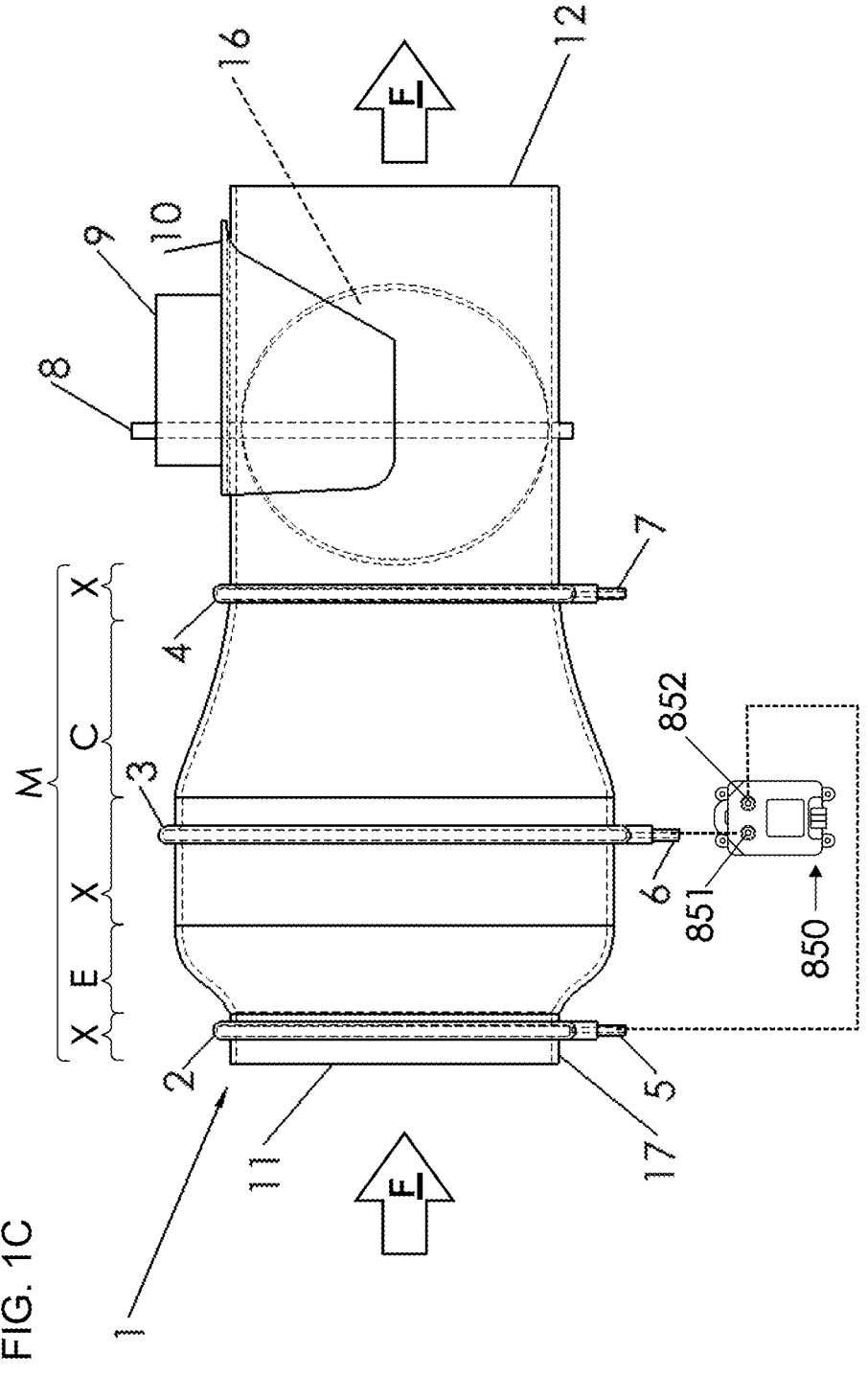
FIG. 1C is a side elevation view of the embodiment of FIGS. 1A and 1B illustrating a single differential-pressure transducer coupled across the expansion section of the device.

FIG. 1C illustrates an embodiment in which a single differential-pressure transducer or sensor (850) is connected to the device (1) to measure pressure across a portion of the expansion side. In this configuration, the low-pressure port (5) of the device (1) is pneumatically coupled to the low-pressure connection (852) of the transducer (850), and the high-pressure port (6) of the device (1) is pneumatically coupled to the high-pressure connection (851) of the transducer (850). The connections are shown schematically and can be formed using flexible pneumatic tubing or other suitable tube or conduit structure(s).

Figure 1D:
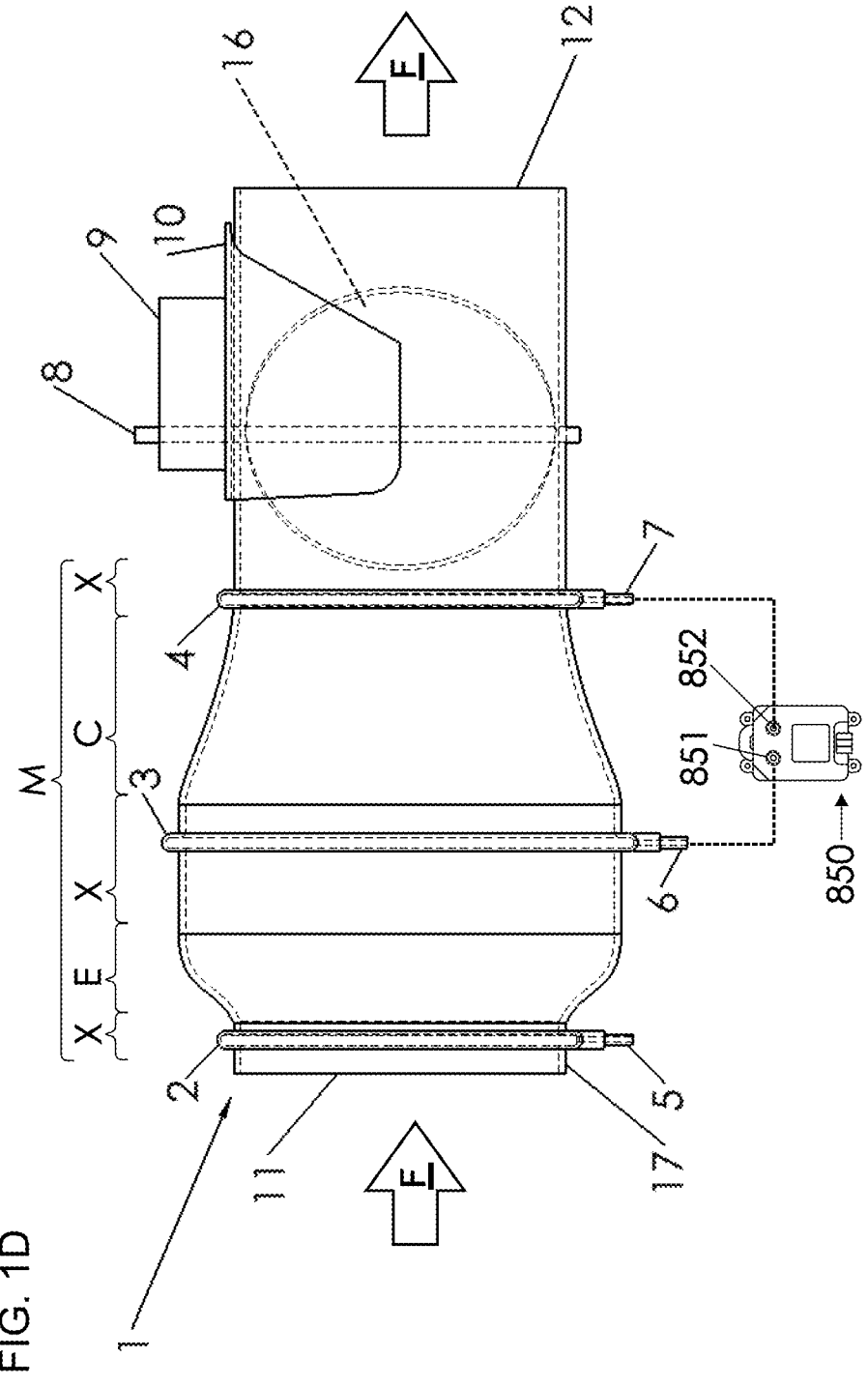
FIG. 1D is a side elevation view of the embodiment of FIGS. 1A and 1B illustrating a single differential-pressure transducer coupled across the contraction section of the device.

FIG. 1D illustrates an embodiment in which a single differential-pressure transducer or sensor (850) is connected to the device (1) to measure pressure across a portion of the contraction side. In this configuration, the high-pressure port (6) of the device (1) is pneumatically coupled to the high-pressure connection (851) of the transducer (850), and the low-pressure port (7) of the device (1) is pneumatically coupled to the low-pressure connection (852) of the transducer (850). The connections are shown schematically and can be formed using flexible pneumatic tubing or other suitable tube or conduit structure(s).

Figure 1E:
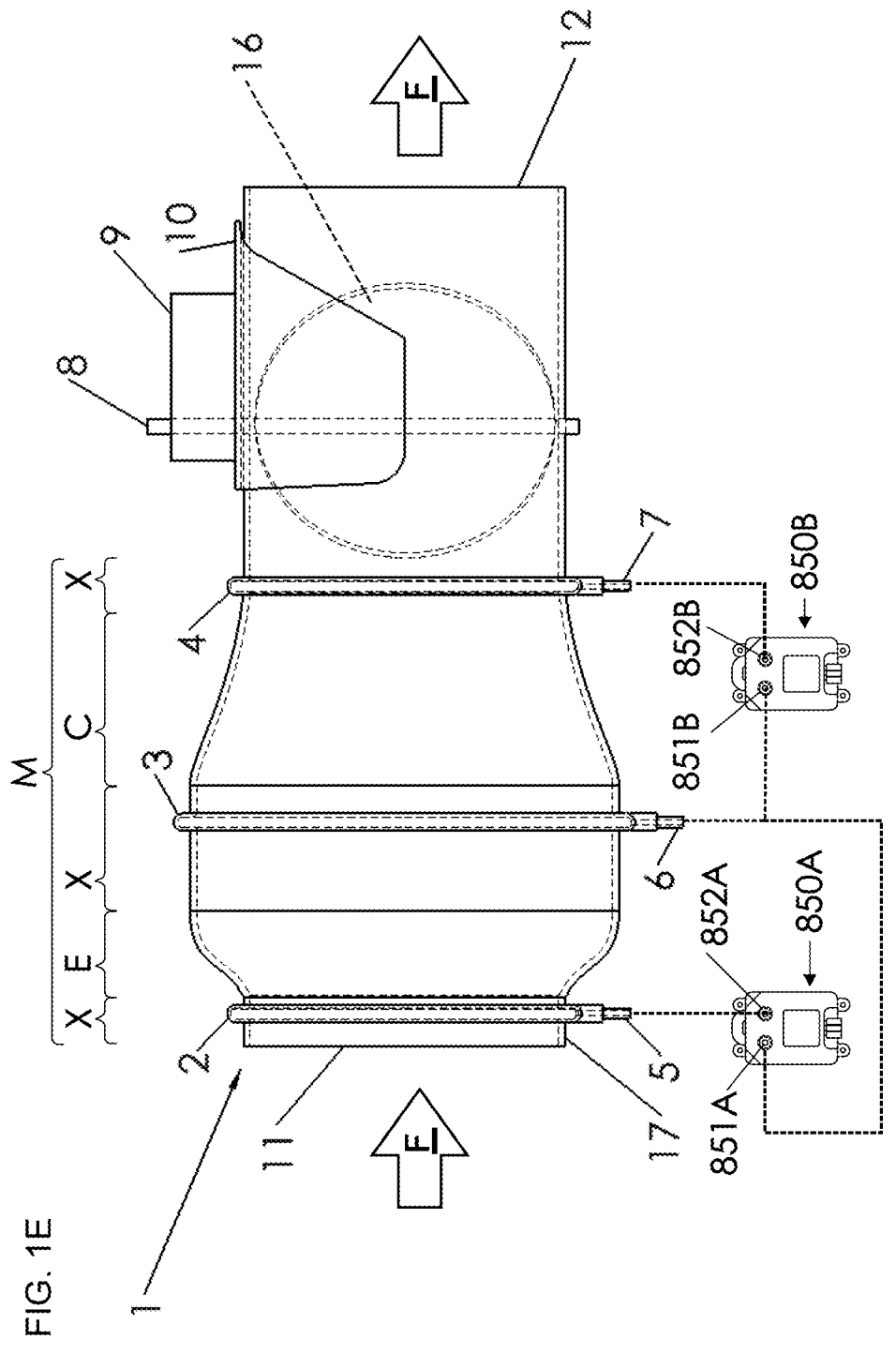
FIG. 1E is a side elevation view of the embodiment of FIGS. 1A and 1B illustrating two differential-pressure transducers independently coupled across the expansion section and the contraction section of the device.

FIG. 1E illustrates an embodiment in which two differential-pressure transducers or sensors (850A, 850B) are connected to the device (1) to measure separate pressure relationships within the flow path. Transducer 850A is configured to measure pressure across a portion of the expansion side and is pneumatically coupled between ports (5) and (6) of the device (1) through its respective low-pressure and high-pressure connections (852A, 851A). Transducer 850B is configured to measure pressure across a portion of the contraction side and is pneumatically coupled between ports (6) and (7) of the device (1) through its respective high-pressure and low-pressure connections (851B, 852B). Port (6) serves as a common pressure tap and is pneumatically tied to both transducers (850A, 850B). The connections are shown schematically and can be formed using flexible pneumatic tubing or other suitable tube or conduit structure(s). In the illustrated embodiment, a composite or average static pressure can be determined electronically by combining or otherwise processing differential pressure signals from the separate pressure transducers (850A and 850B).

Figure 2A:
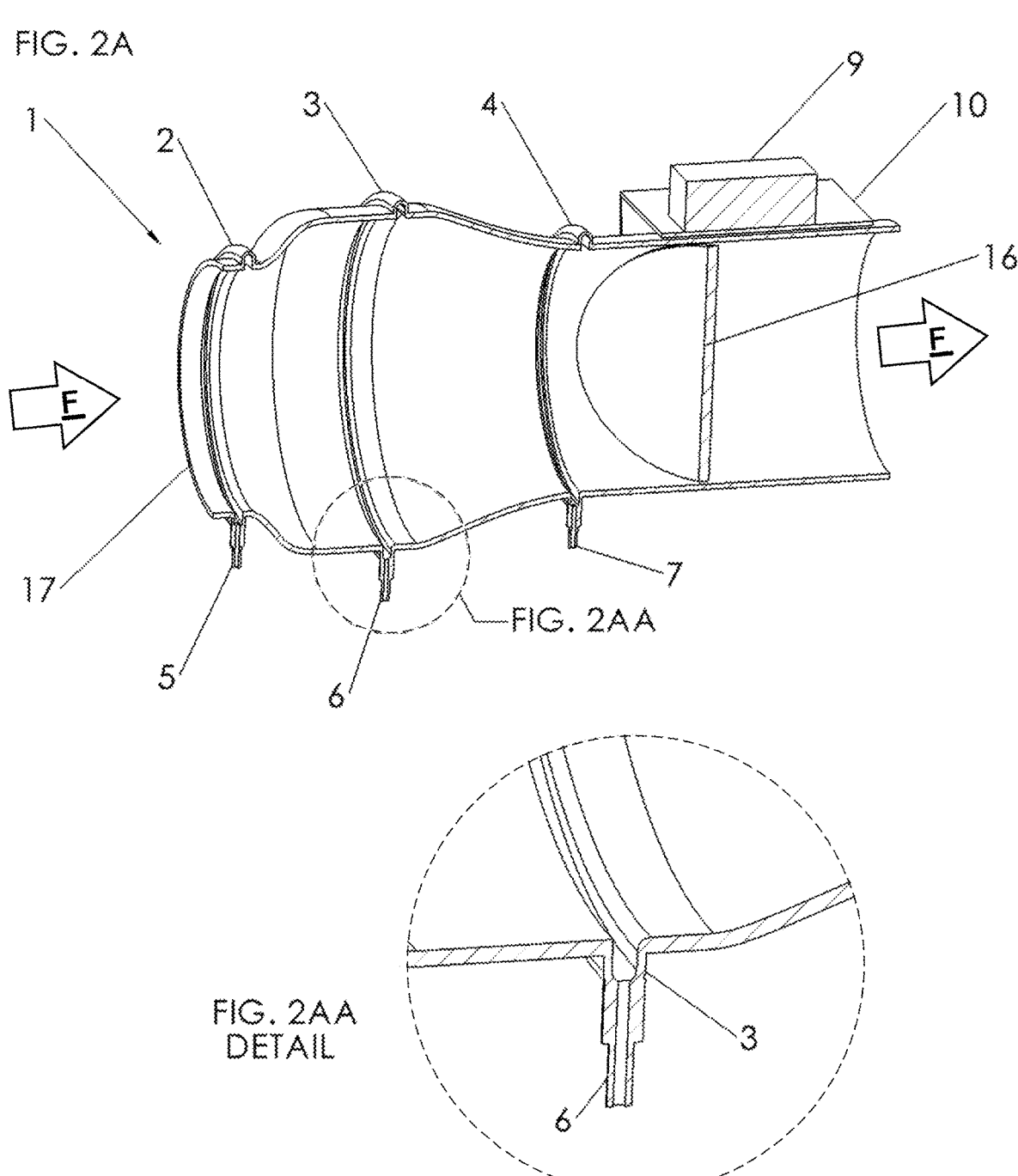
FIG. 2A is a perspective sectional view of the device of FIGS. 1A and 1B.

FIG. 2A is a three-dimensional cutaway view of device (1) illustrating its internal manifolds (2-4) where one or more of the manifolds (2-4) include a pressure-averaging channel that is open to the interior of the flow path (F) along the perimeter of the region corresponding to its associated sensing plane. In the illustrated embodiment, the channel is generally U-shaped, although other shapes are possible. The pressure-averaging channel can extend fully or partially around the perimeter (e.g., hydraulic diameter) of the flow path (F). The channel can be configured to remain recessed or otherwise shielded from the principal flow direction of the internal flow path (F), with a relatively short width in the direction of fluid flow along the flow path (F) so that the channel communicates static pressure uniformly from the sampled region while minimizing local turbulence or disturbance of the main flow stream as shown in FIG. 2AA Detail. The pressure-averaging channel can be substantially devoid of discrete openings facing the flow path (F), in some embodiments; instead, the channel can provide direct fluid communication between the internal flow path (F) and the corresponding manifold cavity. The cross-sectional area of the channel is excluded from the area (A1-A3), with the areas (A1-A3) and the channels measured at the openings to those channels. In various embodiments, the channel can be continuous or segmented, such as circumferential or as a partial arc segment along a circumference, and may be formed by molding, machining, or other suitable processes. The open configuration permits uniform pressure sampling across the measured region while maintaining a smooth, obstruction-free internal surface and reducing the potential for fouling or debris accumulation. In that way, the presence of the channel allows a given manifold (2-4) to have as few as a single outlet port connected to a sensing device, while having an open inlet face that allows the manifold to effectively collect and combine fluid from multiple different perimeter regions at a given position (P1-P3).

In FIG. 2A one or more pressure-averaging channels may be employed independently or in combination. These embodiments are not limiting and may be adapted to various geometries, including circular, rectangular, square, or asymmetric cross-sections, to achieve equivalent static-pressure measurement performance within the measurement zone (M) of device (1).

Figure 2B:
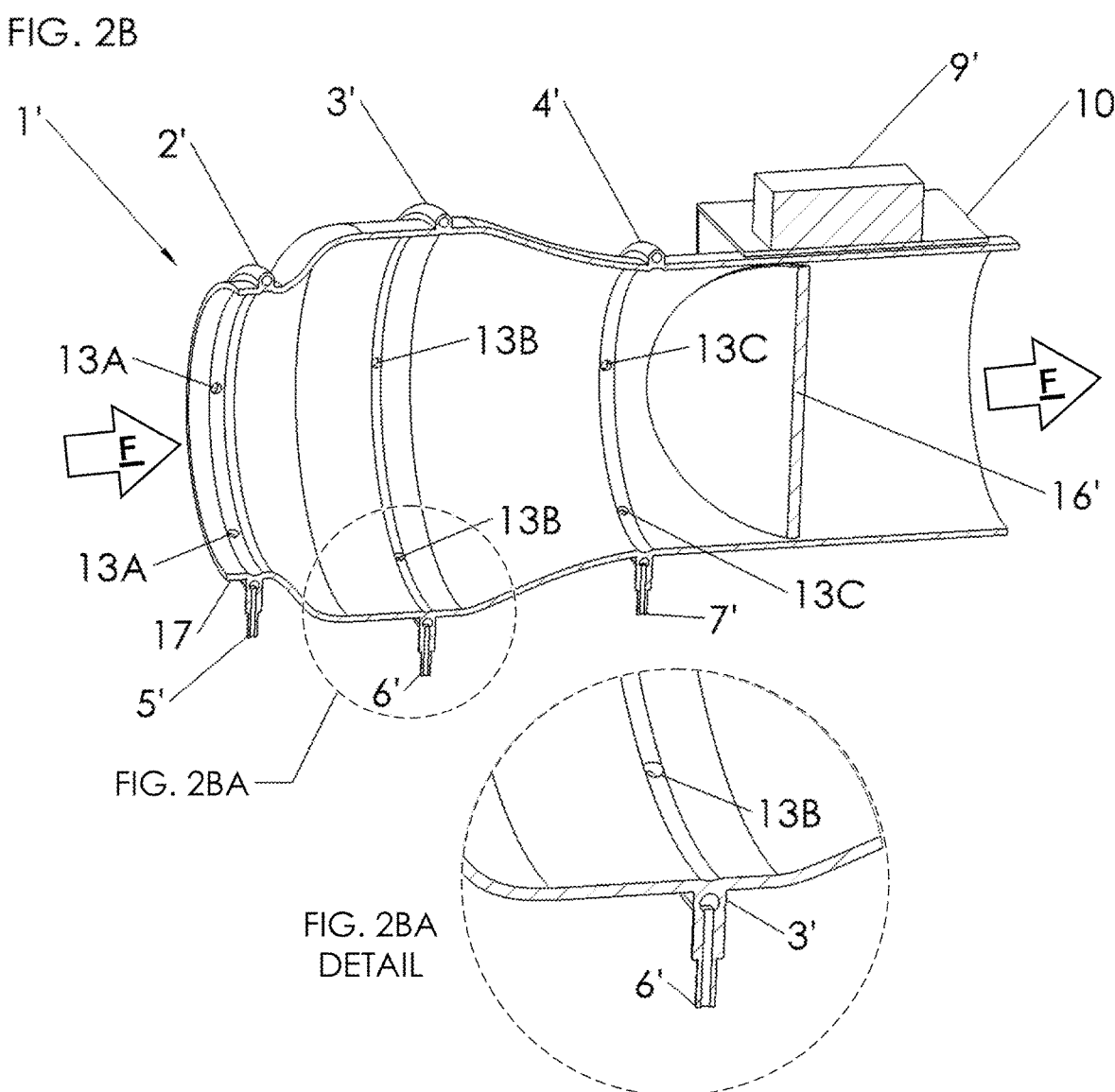
FIG. 2B is a perspective sectional view of another embodiment of a fluid flow measurement device.

FIG. 2B is a three-dimensional cutaway view of an alternative embodiment of the device (1'), showing example configurations of pressure-sensing structures positioned along the measurement zone of the internal flow path (F).

In the embodiment of FIG. 2B, one or more pressure-sensing openings (13A-13C) of the device (1') are distributed around the circumference or perimeter of the flow path (F) at regions corresponding respectively to areas (A1'-A3'). Each set of openings communicates through a wall of the valve body to the associated manifold (2'-4') and corresponding external pressure port (5'-7'). The openings (13A-13C) can be flush, recessed, or of minimal protrusion relative to the internal surface, providing circumferential or perimeter-averaged pressure sampling without introducing significant flow disturbances or fouling points. Axial placement of the openings may be within substantially constant-area plateaus, such as those described with respect to FIG. 1, to promote stable and repeatable static-pressure measurement. In some embodiments, the openings are produced by laser drilling, punching, machining, molding, or other suitable manufacturing methods, and may include multiple openings per ring or segmented array. Optional purge fittings or balancing restrictors may be provided externally in the manifolds (2'-4') while maintaining a smooth internal flow surface.

FIG. 2BA shows an enlarged portion of the manifold region of FIG. 2B, illustrating the local geometry of a representative flush pressure-sensing opening and its interface with the manifold.

Figure 2C:
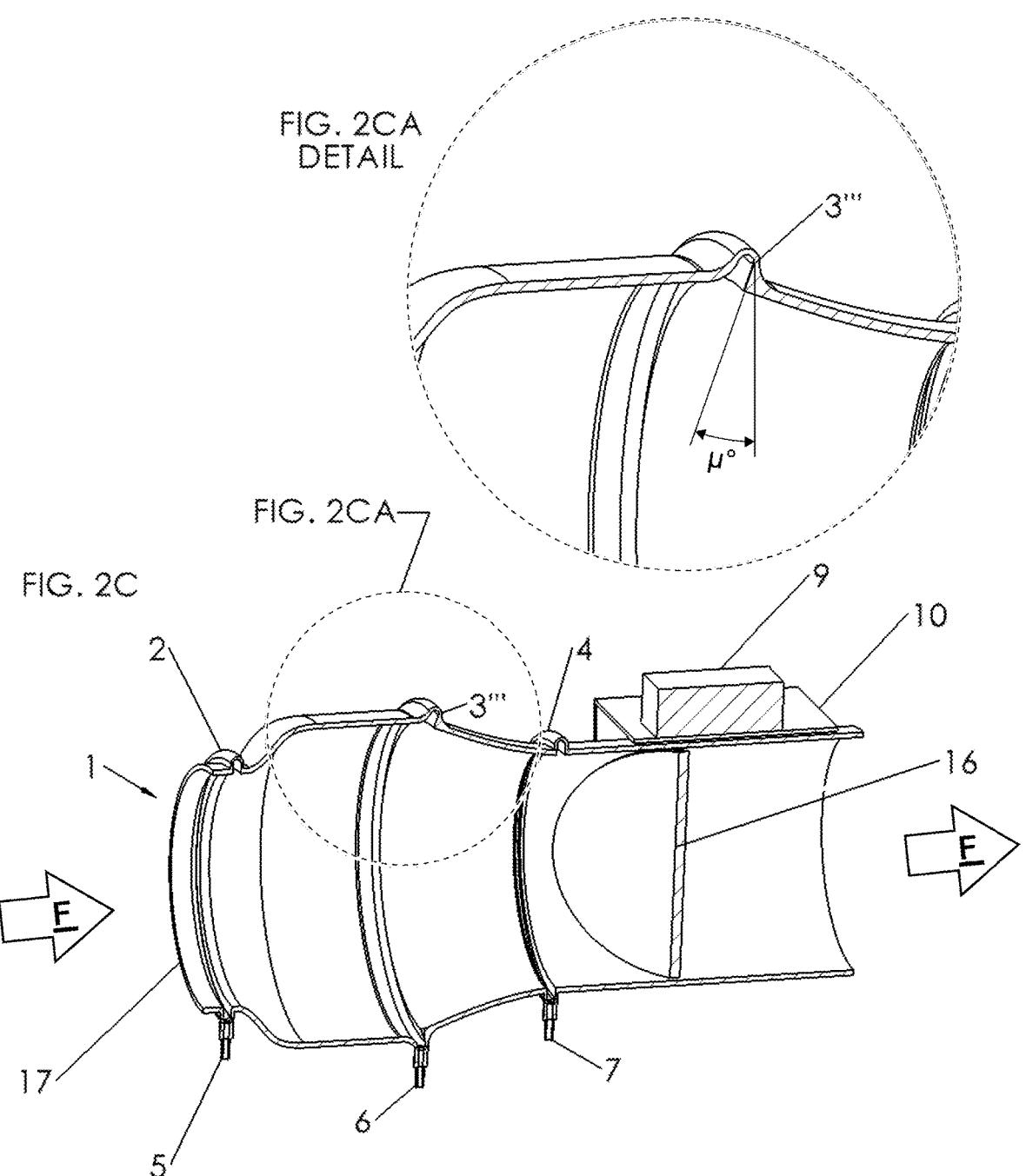
FIG. 2C is a perspective sectional view of another embodiment of a fluid flow measurement device.

FIG. 2C is a three-dimensional cutaway view of another embodiment of device (1), illustrating a pressure-averaging manifold (3''') that includes a channel configured as an open-face trough extending along a portion of the perimeter of the internal flow path (F).

In this embodiment, the channel of the manifold (3''') is canted at an angle ($\mu$) relative to a reference line that is substantially perpendicular to a longitudinal axis of the device (1). The angle ($\mu$) can satisfy the relationship $90°>\mu>0°$, such as $15°>\mu>5°$, in some embodiments. Unlike the recessed, static-pressure-oriented channel configurations shown in FIGS. 2A and 2B, the canted orientation of the channel in FIG. 2C causes the associated manifold (3''') to receive a pressure signal comprising static pressure together with a controlled component of velocity pressure resulting from the reverse-facing orientation of the open trough configuration. By positioning the sampling region within a zone in which the flow naturally accelerates and by canting the open channel partially toward the incoming fluid flow, the device can produce an increased differential pressure between the upstream manifold (3''') and the downstream manifold (4). This increased differential pressure can, in certain embodiments, provide increased resolution when correlating differential pressure to flow rate, while maintaining a smooth internal surface and without introducing intrusive flow-disturbing structures.

FIG. 2CA shows an enlarged detail view of the canted channel region of FIG. 2C, illustrating the geometry of the open-face channel of the manifold (3''') and the angle ($\mu$) at which the trough surface is canted relative to a reference line that is substantially perpendicular to the longitudinal axis of the device (1).

As depicted in the detail, the channel is recessed into the valve-body wall and presents an open inlet face that is canted forward toward the incoming flow. The angle ($\mu$) defines the degree of forward cant and enables controlled admission of a velocity-pressure component while preserving continuity of the surrounding internal surface. The enlarged view shows an example embodiment of the local channel geometry, including the transition between the internal contour and the canted channel inlet, a local body wall thickness, and a fluid-communication interface opening between the channel of the manifold (3''') and a converging zone (C) of the flow path (F). This configuration supports embodiments in which the device is configured to sense a combination of static pressure and velocity pressure at at least one position along the flow path (F), thereby enabling improved flow-measurement performance under various operating conditions.

The illustrated embodiments discussed above highlight the internal pressure-sampling architectures that enable uniform static-pressure collection while maintaining smooth, low-disturbance flow. The embodiments shown illustrate design flexibility between discrete openings and continuous pressure-averaging channels, each supporting accurate, low-fouling operation suited to cleanroom, healthcare, laboratory, and other environments.

Figure 3:
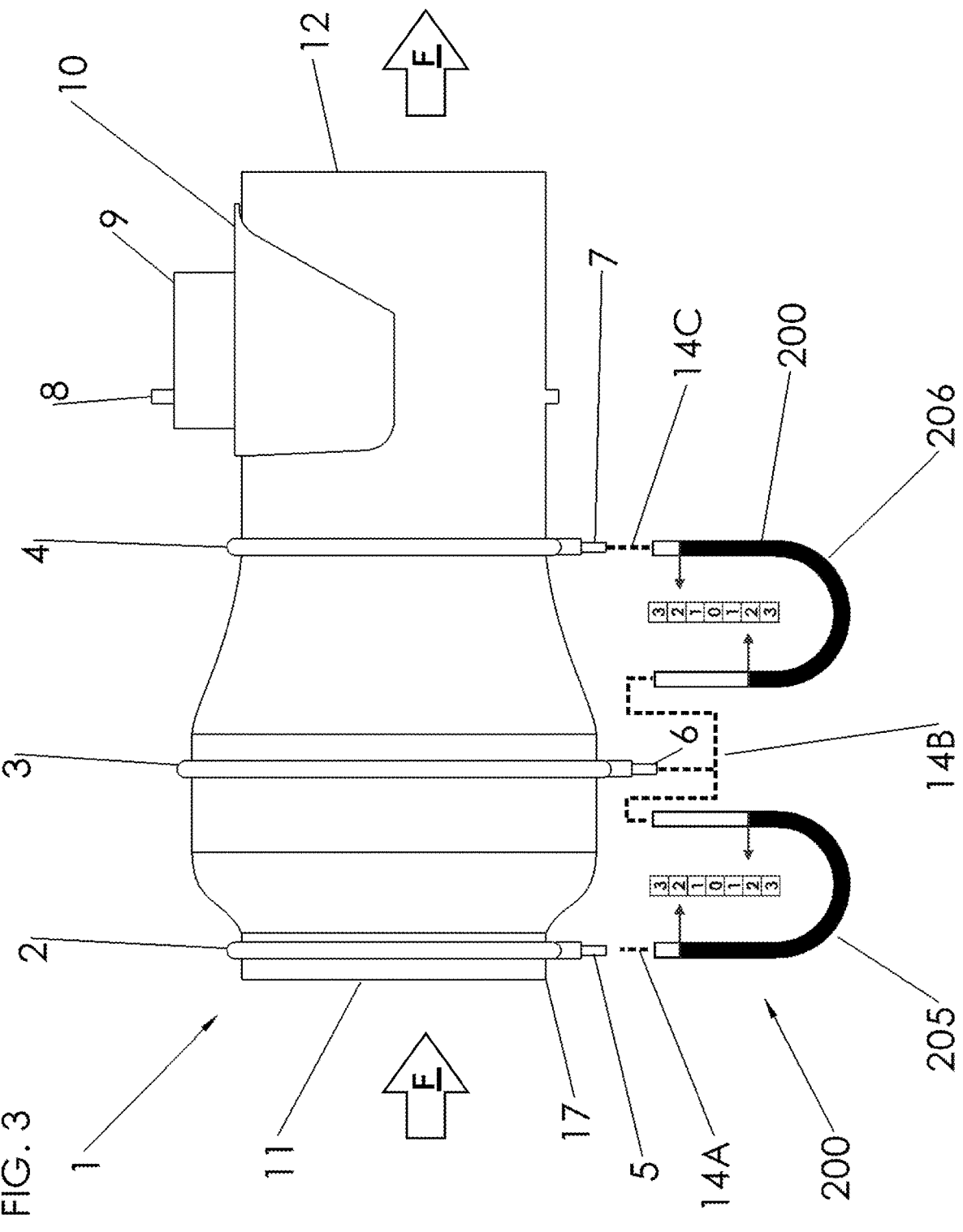
FIG. 3 is a side elevation view of the device of FIGS. 1A and 1B illustrating representative differential pressure sampling locations.
Figure 10:
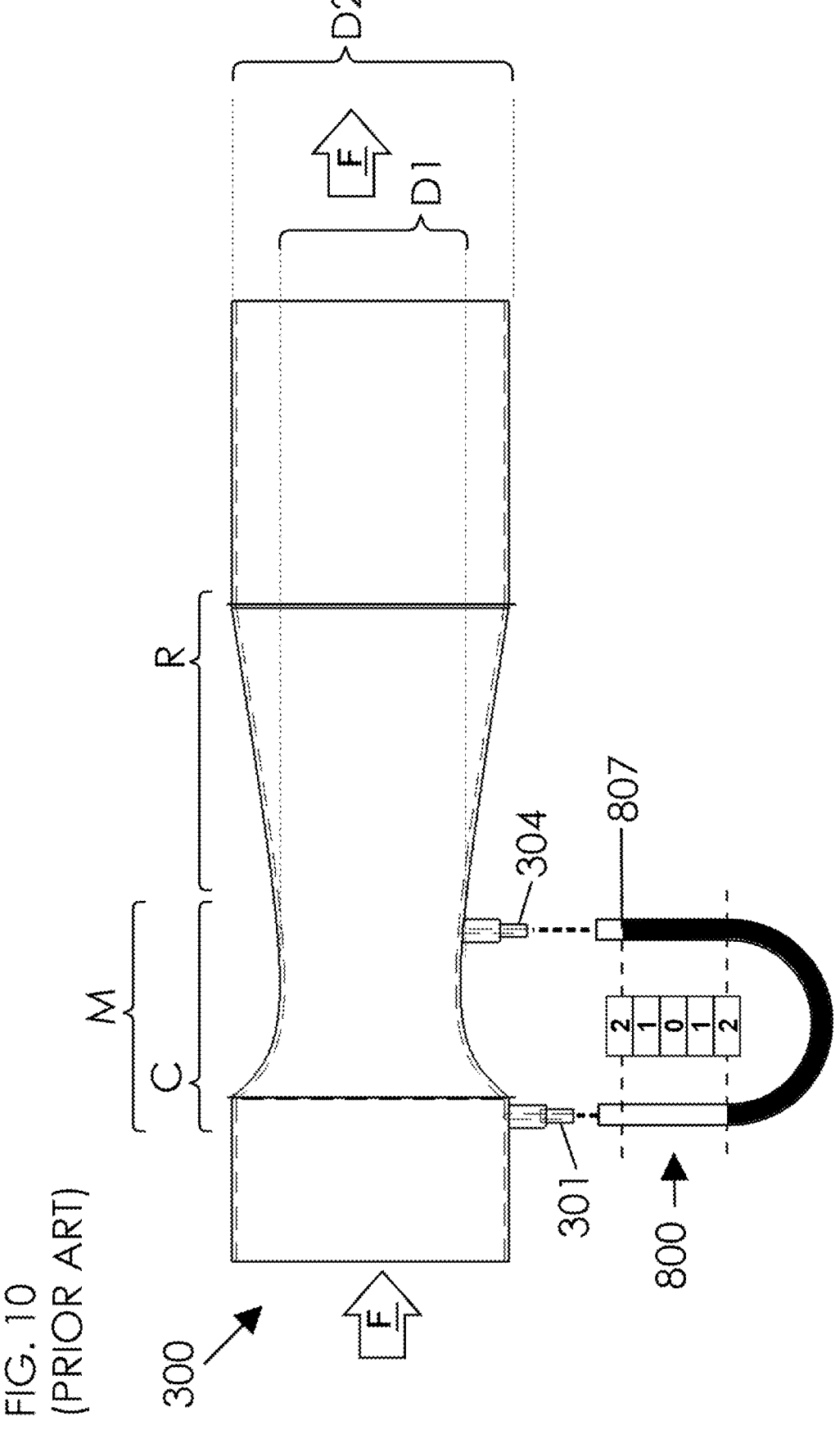
FIG. 10 is a cross-sectional view of a prior art Venturi valve illustrating a throat and pressure recovery section.

FIG. 3 illustrates the pressure operation of the disclosed fluid-flow measurement device (1). The device includes ports (5-7) connected through flexible lines (14A-14C) to U-tube manometers (200) containing working fluids (205, 206). Each manometer represents a differential-pressure relationship between corresponding sensing regions within the measurement zone (M). The configuration establishes two distinct pressure relationships, one across the expansion zone (E), and another across the converging zone (C), providing dual measurement regions within a single flow passage. In comparison, the prior art Venturi valve (300) shown in FIG. 10 defines only a single pressure relationship across its contraction zone, characterized by a throat diameter ($D_1$) that is smaller than its inlet and outlet diameters ($D_2$). The resulting constriction in the venturi generates the differential pressure used for flow measurement in the Venturi arrangement and causes a permanent static pressure drop.

Figure 4:
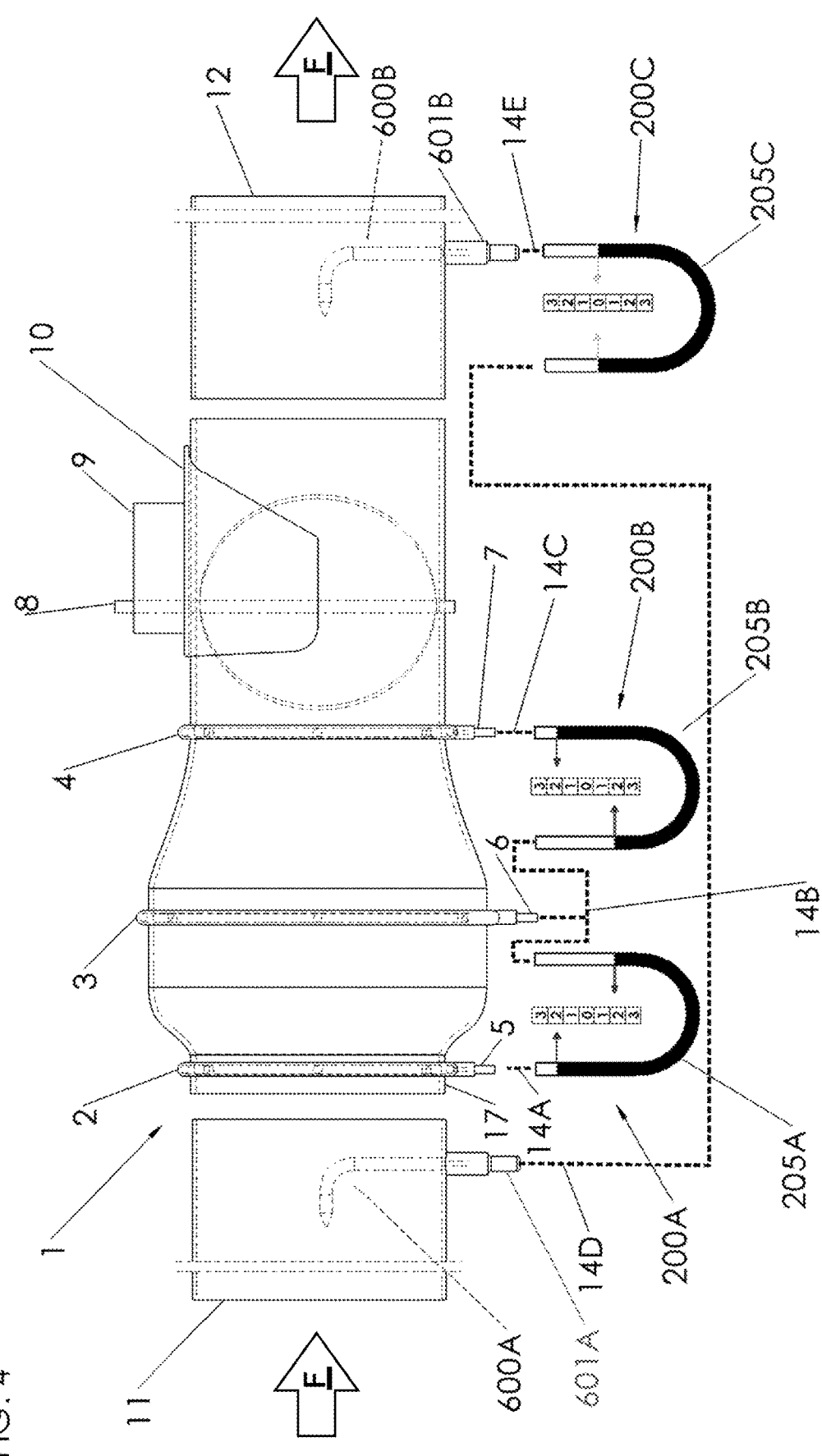
FIG. 4 is a side elevation view of the embodiment of FIGS. 1A and 1B installed in ductwork with pressure probes to measure static pressure drop created by valve.
Figure 5A:
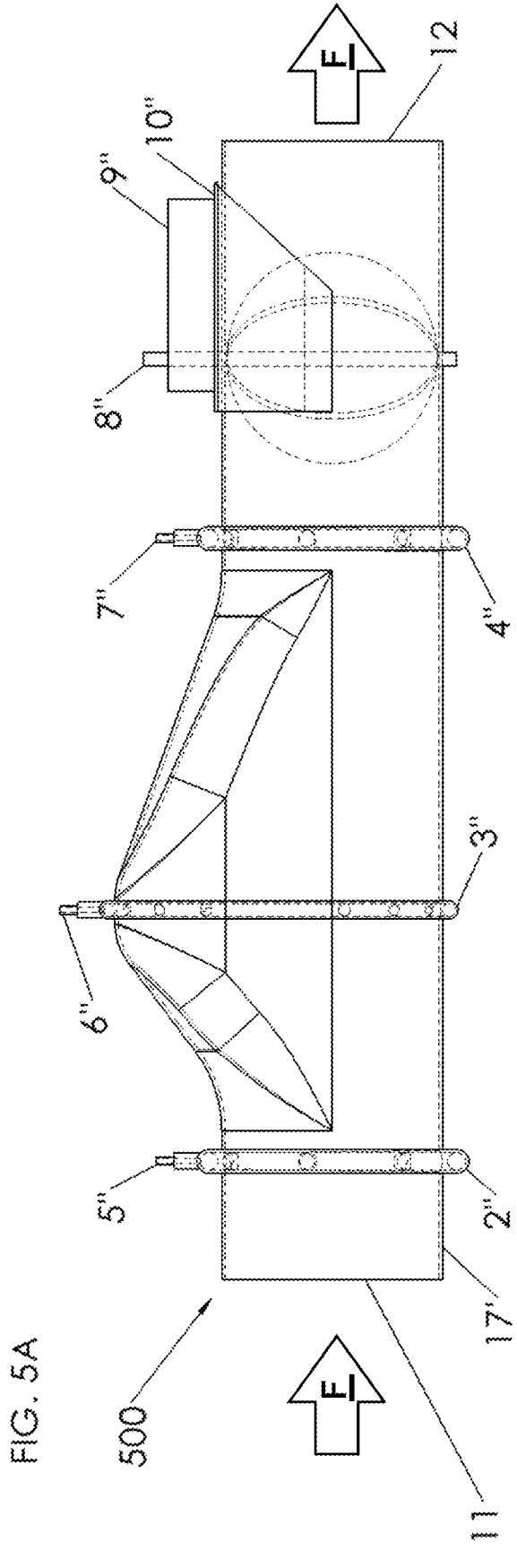
FIG. 5A is a side elevation view of an asymmetrical cylindrical embodiment of the disclosed device.
Figure 5B:
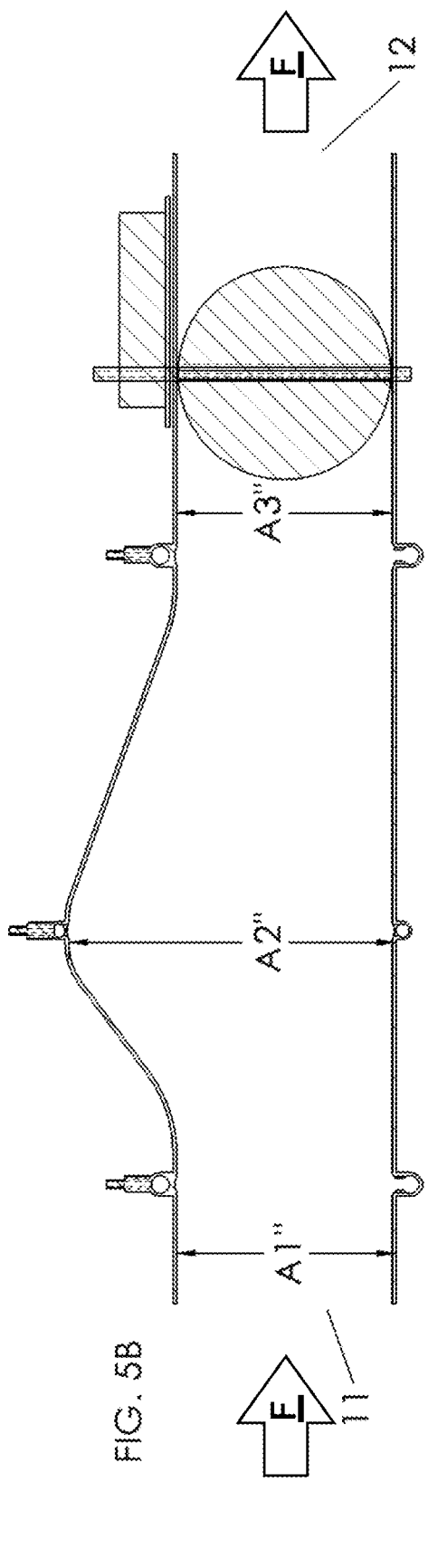
FIG. 5B is a cross-sectional view of the device of FIG. 5A, with structures that would otherwise be visible beyond the section plane omitted for simplicity.
Figure 11:
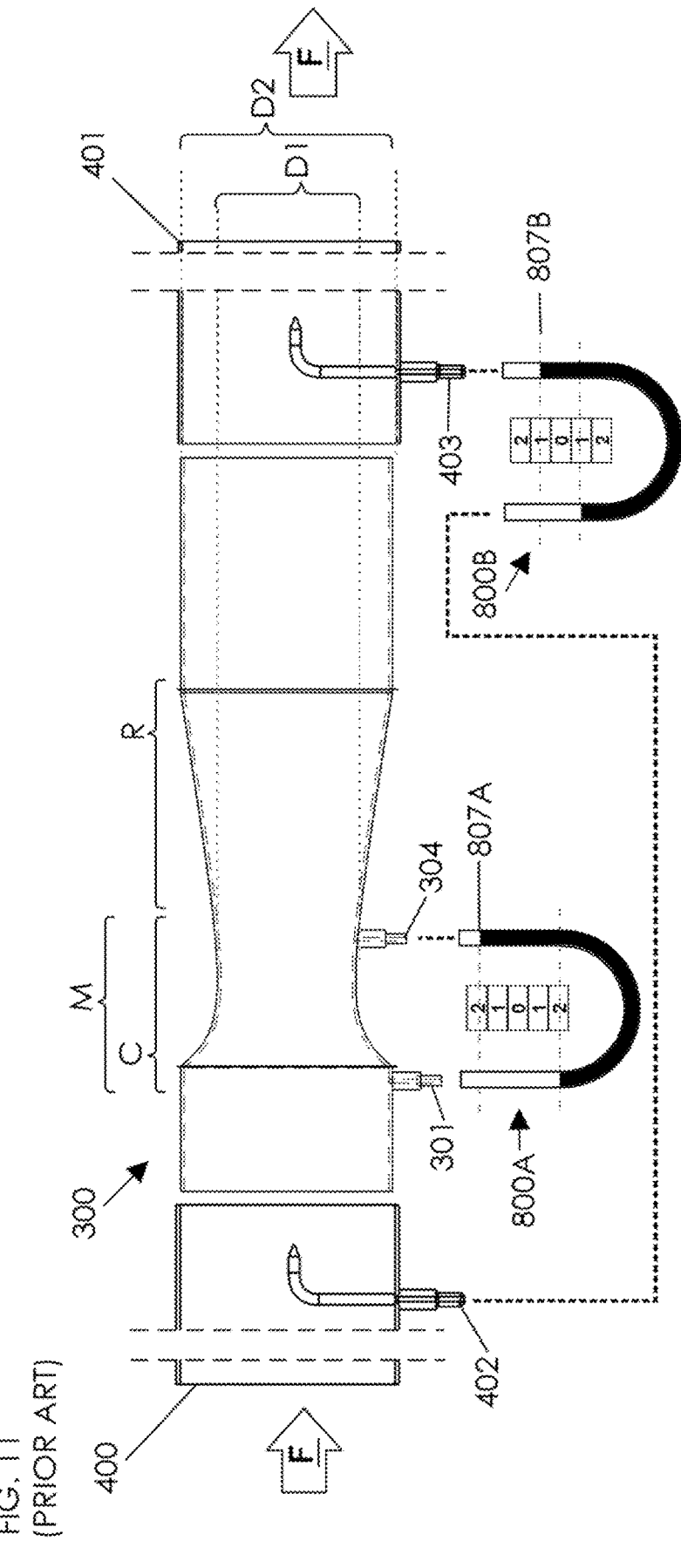
FIG. 11 is a schematic of a prior art Venturi valve installed in ductwork with pressure probes to measure pressure drop of valve.

FIG. 4 illustrates the device (1) installed between representative upstream and downstream duct sections equipped with pressure taps (600A, 600B) for measuring total static-pressure loss. A manometer (200D) is shown connected via flexible lines (14D, 14E) across the assembly to indicate any permanent static-pressure difference. In this illustration, no measurable static-pressure loss is shown within measurement fluid (205C), as the disclosed geometry does not constrict the airflow below the inlet area. By contrast, as referenced in FIG. 11, conventional Venturi valves exhibit a permanent static-pressure drop between comparable pressure taps (402, 403), resulting from the throat restriction defined by diameters $D_1$ and $D_2$ that generates the required differential pressure. FIG. 4 therefore illustrates the improvement of generating two distinct measurable pressure regions while eliminating the inherent pressure loss associated with prior art Venturi configurations.

FIGS. 5A-FIG. 8 illustrate an alternative embodiment of the fluid-flow measurement device (500) having an asymmetrical cylindrical body geometry. At least a portion of the body geometry can be asymmetrical with respect to the flow direction of the internal flow path (F) and/or with respect to a centerline of the internal flow path (F) connecting centers of the inlet (11) and the outlet (12). A working fluid enters the inlet (11), flows along the internal flow path (F), and exits the outlet (12). In this embodiment, the body expands from the inlet region (A1") to an intermediate region (A2") and reconverges toward a downstream region (A3"), forming two distinct potential measurement zones (encompassing zones C or E) within the measurement zone (M). The device (500) otherwise operates according to the same principles described with respect to FIGS. 1A-1B, including the generation of differential pressure signals between the defined regions.

Figure 6:
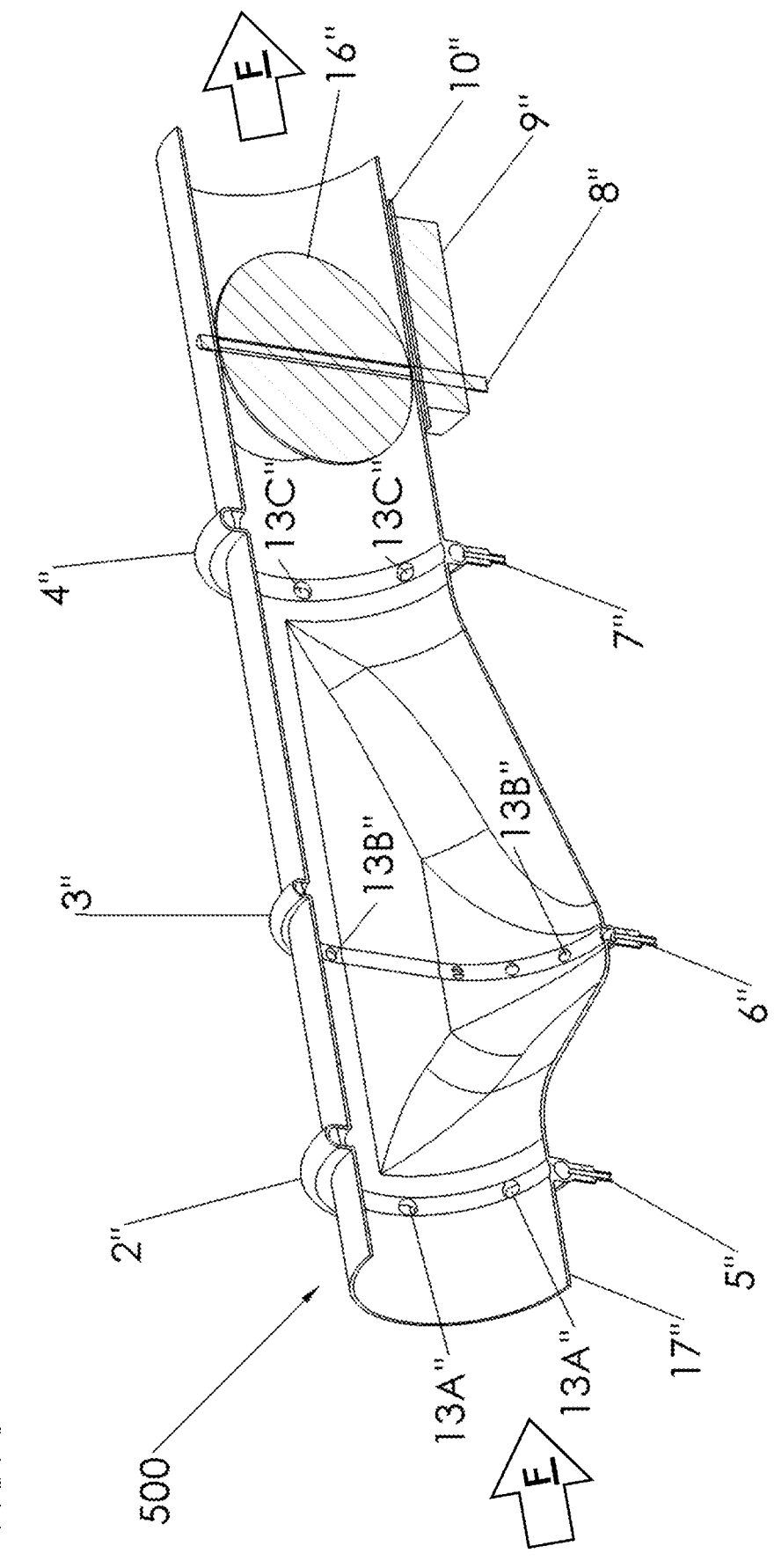
FIG. 6 is a perspective cutaway view of the embodiment of FIG. 5A.

Manifolds (2"-4") are coupled to corresponding pressure ports (5"-7") and communicate with internal openings (13A"-13C") as shown in FIG. 6. The openings may be discrete or continuous and are configured to sample local static pressure without substantial protrusion into the flow path. In other embodiments, the manifolds can employ pressure-averaging channels of the type described in FIG. 2A, which provide open communication with the sensing region while maintaining uniform sampling around the perimeter or hydraulic diameter. Pneumatic coupling to one or more transducers can provide differential-pressure signals representative of flow rate.

Figures 7, 8:
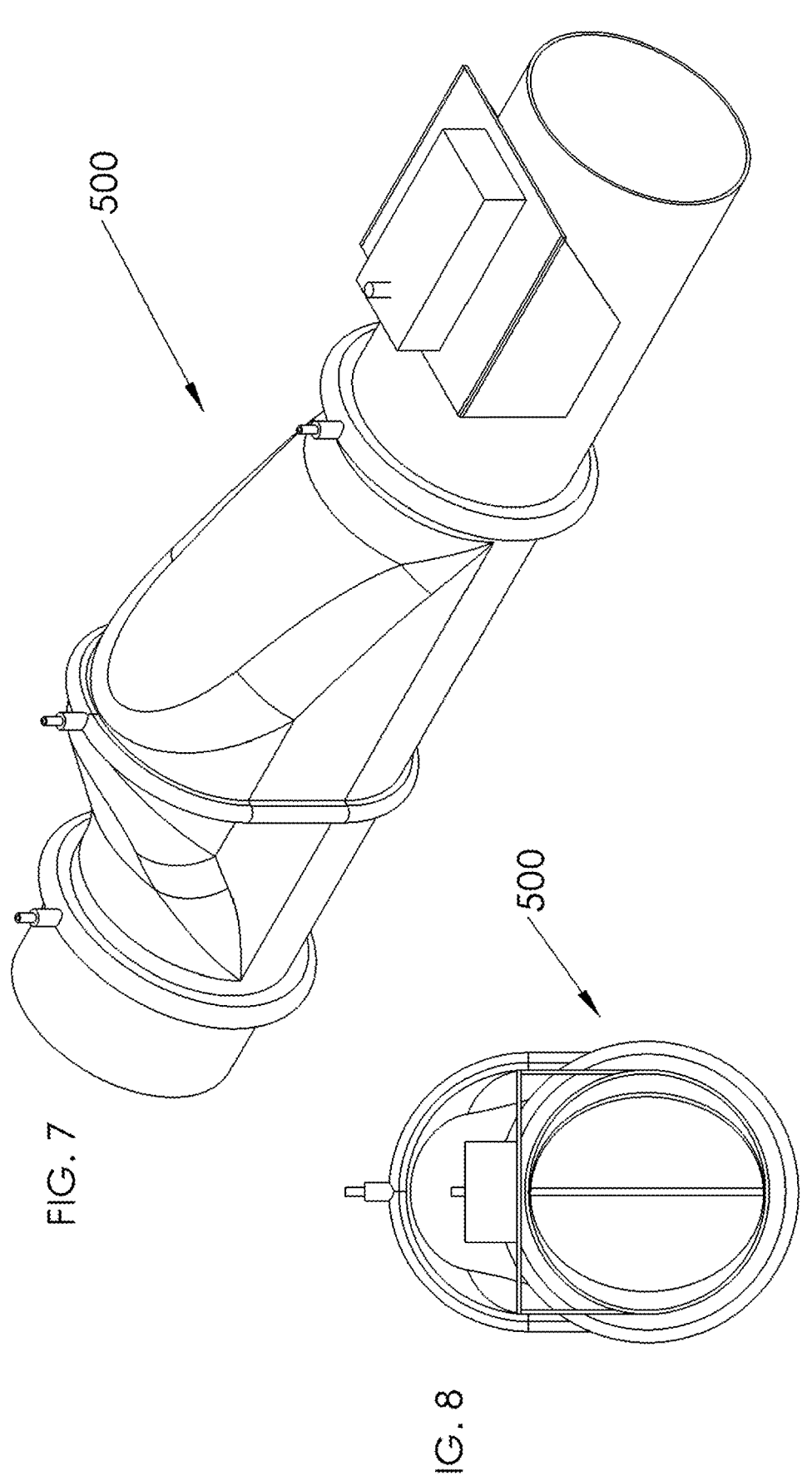
FIG. 7 is a perspective view of the embodiment of FIG. 5A.
FIG. 8 is a throat view of the embodiment of FIG. 5A.

FIG. 7 and FIG. 8 illustrate the asymmetrical cylindrical embodiment of the fluid-flow measurement device (500) in multiple orientations. FIG. 7 highlights the overall body geometry, including the asymmetrical expansion region and subsequent reconverging section. FIG. 8 depicts a longitudinal side profile and an end-on view through the outlet, showing the unobstructed internal flow path.

This figure shows the general configuration and proportional relationships of the asymmetrical body rather than specific component details. The sequence of expansion followed by contraction along the internal flow path (F) is clearly visible, demonstrating the multi-zone measurement concept described with respect to device (1) in FIGS. 1A-1B.

Although the illustrated embodiment employs an asymmetrical form, other embodiments may adopt symmetrical, rectangular, polygonal, or other cross-sectional geometries. Equivalent configurations may include curved or offset body contours while preserving the fundamental principle of first expanding and then reconverging the flow to establish two distinct measurement zones within the measurement region.

The asymmetrical body geometry shown in FIGS. 5A-8 demonstrates that the disclosed dual-zone measurement principle is not limited to symmetrical or axis-uniform forms. Curved or non-uniform wall contours may be used to achieve desired flow characteristics, maintain measurement linearity, or accommodate spatial or manufacturing constraints, while retaining the functional relationship among the sensing regions (A1"-A3"). The inclusion of optional control components illustrates compatibility with active flow or pressure regulation.

Figure 9:
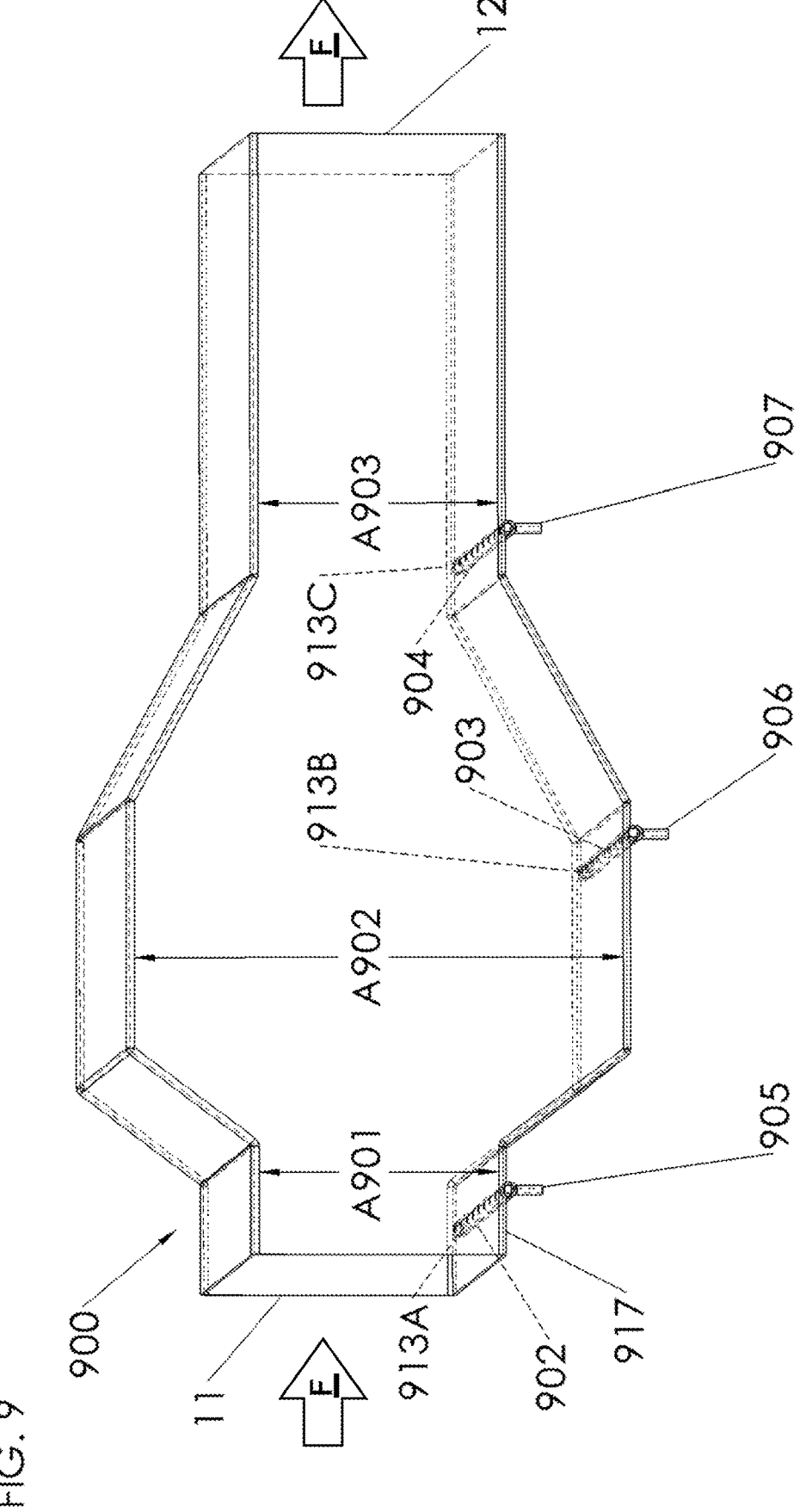
FIG. 9 is a cut away view of a square embodiment of the disclosed device formed from planar duct sections.

FIG. 9 illustrates yet another embodiment of the fluid-flow measurement device (900) configured in a rectangular or polygonal form. A working fluid enters the inlet (11), flows through the internal path (F), and exits the outlet (12). In this embodiment, the internal passage expands from the inlet region (A901) to an intermediate region (A902) and reconverges toward a downstream region (A903), forming two distinct measurement zones within the measurement region.

Manifolds (902, 903, 904) are coupled to corresponding external ports (905, 906, 907) and communicate internally through openings (913A, 913B, 913C), which permit static-pressure sampling at each respective region. The openings may be discrete or continuous, configured to provide representative pressure averaging across the flow area without significant protrusion into the flow path. In other embodiments, the manifolds can incorporate pressure-averaging channels of the type described with respect to FIG. 2A, allowing open communication with the sensing region while maintaining uniform sampling around the perimeter or hydraulic diameter. Pneumatic coupling to one or more transducers can transmit these signals for differential-pressure measurement.

The embodiment shown in FIG. 9 demonstrates that the disclosed dual-zone flow-measurement geometry is not limited to cylindrical constructions. The rectangular or polygonal form shown may be fabricated from sheet metal or other planar construction methods while preserving the flow path sequence of expansion followed by contraction.

FIG. 9 highlights the adaptability of the design to alternate geometries and fabrication methods while still providing multiple possible sequential measurement zones-providing accurate, low-loss differential-pressure sensing across a wide range of system configurations.

Although three representative sampling regions are illustrated in each of the embodiments of the devices (900), the number, position, and configuration of manifolds and ports can vary to suit application requirements.

The disclosed device may be integrated into control systems at various levels to measure and/or regulate fluid flow. In a measurement-only configuration, one or more differential-pressure signals may be generated for monitoring, logging, diagnostics, or verification purposes. In control configurations, the measured signals may be processed by an embedded or external controller—operating with or without an operating system—to modulate a damper, valve, actuator, or other flow-modulating element in accordance with a specified condition. Such control may be implemented in open-loop form, where actuation is based on a fixed or predetermined command, or in closed-loop form, where the measured flow, pressure, or other process variable is continuously compared to a setpoint and corrected in real time. Control objectives may include maintaining constant flow, volumetric offset, adjusting to a programmed trajectory, or meeting dynamic or safety-related requirements. The device may function as a stand-alone controller receiving a direct setpoint and modulating flow accordingly, or it may operate as part of a building automation system (BAS) exchanging signals via standard protocols such as BACnet, Modbus, or LON. Output signals may also be utilized for energy management, compliance monitoring, or operational optimization within larger facility networks. These modes of operation are representative and not limiting, and the device may be employed in other process or environmental control systems requiring accurate flow measurement and regulation.

Pressure-sensing ports of the device may be coupled to a wide variety of transducers or other measurement technologies. These may include dead-ended designs, which prevent through-flow contamination, or flow-through types. Transducers may employ silicon or metallic diaphragms, MEMS elements, optical, ultrasonic, capacitive, thermal-anemometric, or laser-Doppler sensing principles. The sensing devices may provide outputs in analog form (such as voltage or current) or in digital form (such as SPI, $I^2C$, or other serial communication protocols). Alternative methods of measuring differential pressure, velocity, or volumetric flow may also be employed without departing from the scope of the invention. Future or yet-to-be-commercialized sensing technologies may likewise be incorporated to achieve the desired measurement accuracy and reliability.

The flow-modulating element may take many forms and may be configured to increase or decrease the flow rate through the device. In some embodiments, the element may include a damper, valve, or other throttling mechanism having blades or vanes of cylindrical, rectangular, elliptical, butterfly, iris, or other geometries. Other embodiments may incorporate louvers, sliding plates, iris mechanisms, or comparable mechanical arrangements suitable for adjusting flow. The flow-modulating element may also employ emerging or future flow-control technologies not yet commercially available, without departing from the scope of the invention.

The disclosed device may be applied across a broad range of airflow, liquid flow, and mixed-phase flow systems. Representative applications include fume hoods, fume snorkels, negative or positive isolation rooms, biosafety laboratories (BSL-1 through BSL-4), vivariums, cleanrooms, pharmaceutical manufacturing areas, pharmacies, oncology preparation spaces, sterile corridors, sterile or isolation storage, and other controlled environments. Additional uses may include commercial and industrial facilities such as air handlers, outside-air intakes, supply or exhaust ducts, dirty manufacturing environments, and process exhaust systems. The device may further be implemented in office spaces, meeting rooms, research facilities, teaching facilities, healthcare spaces (including imaging rooms such as x-ray, MRI, and other diagnostic or treatment areas), or in process fluid distribution networks and liquid-handling or industrial piping systems. The same principles are applicable in HVAC, laboratory, healthcare, and industrial installations where accurate measurement and control of flow are desired. The device may operate as a stand-alone unit, as part of a building automation system, or as an embedded or redundant element within a broader control scheme.

The device may be incorporated into systems that include temperature control, humidity control, reheat coils, air quality regulation, or other fluid-conditioning elements. In some embodiments, the device may also coordinate with multiple flow control elements to balance supply and exhaust within a zone, room, or facility. The device may further be integrated with outside air streams associated with air-handling units or similar systems. In addition to HVAC, the disclosed integration approach may also be applied in other fluid systems, including but not limited to liquid handling, process fluid distribution, or mixed-phase flow applications, where accurate flow measurement and control are desired.

The device may be constructed from a wide range of materials and by numerous manufacturing methods. Suitable materials may include steel, galvanized steel, aluminum, other metals, alloys, plastics, polymers, composites, fabrics (including canvas), elastomers, rubbers, or combinations thereof. These materials may be employed in rigid, semi-rigid, or flexible forms to achieve specific performance, cost, corrosion-resistance, or weight objectives. Manufacturing methods may include casting, machining, spinning, stamping, punching, forming, injection molding, additive manufacturing (such as 3-D printing), or other known or future fabrication techniques. In some embodiments, hybrid or multi-process construction may be used, combining different materials or fabrication methods within a single device to obtain desired mechanical, thermal, or aerodynamic characteristics.

Coatings or surface finishes may be applied for a variety of protective or performance-enhancing purposes. These may include, but are not limited to, improving corrosion and chemical resistance, increasing durability, reducing fouling or particulate accumulation, promoting smoother or more laminar airflow, or providing hydrophobic, antimicrobial, anti-sparking, explosion-resistant, or other specialized properties. Examples of suitable coatings include epoxy coatings, baked phenolic coatings, powder coatings, and heresite coatings. Additional finishes may include low-friction or anti-adhesion films, hydrophobic or oleophobic layers for moisture control, and conductive or dissipative coatings for hazardous or static-sensitive environments. The selection of coating or finish may vary according to the intended application, environmental conditions, regulatory requirements, or desired performance characteristics.

The disclosed device may be implemented across a broad range of conduit sizes, flow rates, and applications. Configurations may be scaled for small-diameter ducts typical of individual airflow control devices or for large commercial air-handling trunks. The same principles may also be applied to non-ducted systems, including liquid distribution piping, industrial process streams, or other fluid flow environments.

The geometry may be adapted to provide stable and accurate measurement across a wide turndown range, maintaining reliability at both low-flow and high-flow conditions. The device may be designed to generate differential pressure signals that are compatible with commonly available transducers, including those used in HVAC, industrial, laboratory, and liquid handling systems. In some embodiments, multiple differential pressure regions may be selected or averaged to provide stable flow measurement across varying operating conditions.

By way of illustrative, non-limiting preliminary prototype data of a representative 6-inch prototype embodiment of the disclosed reverse-geometry airflow valve as depicted in FIGS. 1A-2B demonstrated accurate measurement down to approximately 9.25 CFM with stability of ±3 CFM, and supported flows of about 1,300 CFM at 2 inches water column (WC) static pressure. Additional testing showed operation up to approximately 1,600 CFM at 3 inches WC and about 1,850 CFM at 4 inches WC. These results correspond to turndown ratios on the order of at least 80:1, and in some cases exceeding 100:1.

These preliminary values are provided solely as non-limiting, illustrative examples. Actual performance may be greater or lesser than these values depending on duct size, geometry, surface finish, installation conditions, system static pressure, and transducer configuration. Other embodiments may achieve higher maximum flows, lower minimum measurable flows, or different turndown ratios than those reported. Larger duct sizes may provide even higher maximum flow capacity, while smaller ducts may provide proportionally lower capacities. In all cases, the disclosed geometry avoids throat constriction and thus maintains greater duct capacity relative to Venturi-type valves, with the additional benefit of reduced noise due to lower face velocities at equivalent volumetric flows.

The geometry of the device and the internal flow path may take any form that expands and reconverges fluid flow, including but not limited to circular, square, rectangular, polygonal, asymmetric, or irregular shapes. Any geometry configured to create measurable pressure differentials during expansion and contraction is intended to be included.

Pressure sensing ports may be located at any position along the device, including but not limited to before the expansion, within the expansion region, between the expansion and contraction, within the contraction, or at other points along the geometry. Ports may be positioned singly or in combination, may sample at multiple depths along the flow path, and may be used individually, combined, or averaged to determine differential pressure.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, transitory signal fluctuations (e.g., due to transitory variations in electrical power supplied to a sensor), and the like. Moreover, any relative terms or terms of degree used herein should be interpreted to encompass a range that expressly includes the designated quality, characteristic, parameter, or value, without variation, as if no qualifying relative term or term of degree were utilized in the given disclosure or recitation.

The word "comprise", or variations such as "comprises" or "comprising" are used in an open-ended manner herein and should be interpreted to refer to the inclusion of a stated element, feature, or step, or group of elements, features, or steps, but not the exclusion of any other element, feature, or step, or group of elements, features, or steps. Unless further expressly qualified, use of the word "comprise" or variations thereof does not, alone, exclude the presence of additional, unrecited elements, steps, or groups of elements or steps. Additionally, unless further expressly qualified, the words "a" and "an" as used herein refer to one or more and do not limit the identified element, feature, step, or the like to one and only one. However, use of the words "a" and "an" herein should be interpreted in accordance with and subject to any applicable further limits expressly stated in the context of any particular instance of usage, without extending such context-specific limits to all other uses generally.

It is understood that numerous variations, alternatives, and equivalents of the disclosed device may be implemented without departing from the scope of the invention. For instance, features described with respect to one embodiment can generally be utilized with other disclosed embodiments, unless incompatible. Additionally, a manifold having a channel open to the flow path can be utilized in devices with known venturi shapes that create a throat constriction.

Moreover, while certain positions and areas are labeled in drawings of illustrative embodiments, the location of claimed positions, areas, and lines encompass other embodiments, including those not specifically illustrated or labeled in the drawings.

The invention claimed is:

1. A fluid flow device comprising:
a body with an internal flow path that expands then contracts in a direction of fluid flow, the internal flow path having an inlet, a first region having a first cross-sectional area (A1), a second region having a second cross-sectional area (A2), a third region having a third cross-sectional area (A3), and an outlet, wherein the first, second, and third regions are each located in between the inlet and the outlet, wherein A2>A1, and wherein a minimum cross-sectional area (Amin) of the internal flow path between the inlet and the outlet is equal to or greater than AR·A1, where AR≥0.70;
a high-pressure manifold fluidically connected to the internal flow path at the second cross-sectional area (A2);
a first low-pressure manifold fluidically connected to the internal flow path at the first cross-sectional area (A1), at the third cross-sectional area (A3), or at both the first and third cross-sectional areas (A1 and A3); and
a first sensor operatively connected to the high-pressure manifold and the first low-pressure manifold, the first sensor configured to sense a pressure differential.

2. The fluid flow device of claim 1 and further comprising:
a plateau region having a substantially constant area, wherein the second cross-sectional area (A2) is located at or within the plateau region.

3. The fluid flow device of claim 1, wherein the first and third cross-sectional areas (A1 and A3) are substantially equal.

4. The fluid flow device of claim 1, wherein the first cross-sectional area (A1) is located upstream of the second cross-sectional area (A2) and the first region adjoins the inlet, and wherein the second cross-sectional area (A2) is located upstream of the third cross-sectional area (A3) and the third region adjoins the outlet, such that, in a direction of flow, the internal flow path expands in an expansion zone located between the first and second cross-sectional areas (A1 and A2) and then contracts in a contraction zone located between the second and third cross-sectional areas (A2 and A3).

5. The fluid flow device of claim 1 and further comprising:
a second low-pressure manifold, wherein the first low-pressure manifold is fluidically connected to the internal flow path at the first cross-sectional area (A1), and wherein the second low-pressure manifold is fluidically connected to the internal flow path at the third cross-sectional area (A3).

6. The fluid flow device of claim 5, wherein the first sensor is further operatively connected to the second low-pressure manifold.

7. The fluid flow device of claim 5 and further comprising:
a second sensor operatively connected to the high-pressure manifold and the second low-pressure manifold, the second sensor configured to sense a pressure differential.

8. The fluid flow device of claim 1, wherein the high-pressure manifold includes a channel open to the internal flow path along at least a portion of a perimeter of the second cross-sectional area (A2).

9. The fluid flow device of claim 8, wherein the channel is open to the internal flow path along substantially the entire perimeter of the second cross-sectional area (A2).

10. The fluid flow device of claim 8, wherein the channel is canted.

11. The fluid flow device of claim 1, wherein the high-pressure manifold includes a plurality of openings in fluid communication with the internal flow path, wherein the plurality of openings are circumferentially-spaced from each other along a perimeter of the second cross-sectional area (A2).

12. The fluid flow device of claim 1, wherein the internal flow path has a substantially constant area immediately upstream of the first cross-sectional area (A1), and wherein the internal flow path has a substantially constant area immediately downstream of the third cross-sectional area (A3).

13. The fluid flow device of claim 1 and further comprising:
a damper positioned in the internal flow path; and
a controller operatively coupled to the first sensor and the damper, the controller configured to regulate a position of the damper in response to the sensed pressure differential to control volumetric flow.

14. The fluid flow device of claim 1, wherein the internal flow path is asymmetrical at least at a perimeter of the second cross-sectional area (A2).

15. The fluid flow device of claim 1, wherein Amin≈A1≈A3.

16. A method of operating a fluid flow device, the method comprising:
moving a fluid through an internal flow path that expands and then contracts in a direction of fluid flow, the internal flow path having a first cross-sectional area (A1) at a first position, a second cross-sectional area (A2) at a second position, and a third cross-sectional area (A3) at a third position, wherein the first, second, and third positions are at different locations along the internal flow path, wherein A2>A1, and wherein A3 is equal to or greater than AR·A1, where AR≥0.70; and
measuring a pressure differential between a high-pressure manifold and at least one low-pressure manifold, wherein the high-pressure manifold is fluidically connected to the internal flow path at the second cross-sectional area (A2), and wherein the at least one low-pressure manifold is fluidically connected to the internal flow path at the first cross-sectional area (A1), at the third cross-sectional area (A3), or at both the first and third cross-sectional areas (A1 and A3).

17. The method of claim 16, wherein the first cross-sectional area (A1) is located upstream of the second cross-sectional area (A2), and wherein the second cross-sectional area (A2) is located upstream of the third cross-sectional area (A3), the method further comprising expanding the fluid in the internal flow path in an expansion zone located between the first and second cross-sectional areas (A1 and A2) and constricting the fluid in the internal flow path in a contraction zone located between the second and third cross-sectional areas (A2 and A3).

18. The method of claim 16, wherein the step of moving the fluid through an internal flow path includes expanding the fluid asymmetrically relative to a centerline of the internal flow path.

19. The method of claim 16 and further comprising:
actuating a damper as a function of the sensed pressure differential to control volumetric flow along the internal flow path.

20. The method of claim 16, wherein a minimum cross-sectional area (Amin) of the internal flow path between an inlet and an outlet satisfies Amin≈A1≈A3.

21. The method of claim 16, wherein the fluid is moved along the internal flow path from an inlet followed by an expansion zone downstream from the inlet that expands in cross-sectional area, followed by a constriction zone downstream from the expansion zone that contracts in cross-sectional area, and then to an outlet, wherein a minimum cross-sectional area of the internal flow path is substantially the same between (a) the inlet and the expansion zone and (b) the expansion zone and the outlet.

22. The method of claim 16 wherein the measured pressure differential is measured at a single measurement zone extending from the second cross-sectional area (A2) either upstream or downstream to just one of the first cross-sectional area (A1) or the third cross-sectional area (A3).

23. The method of claim 16, wherein the measured pressure differential is either an average or combination of a plurality of pressure differential values collected at different zones along the internal flow path.

24. The method of claim 16, wherein the measured pressure differential includes both a static pressure component and a velocity pressure component.

25. A fluid flow assembly comprising:
a body with an internal flow path that expands then contracts in a direction of fluid flow, the internal flow path having an inlet, a first region located downstream of the inlet and having a first cross-sectional area (A1), a second region located downstream of the first region and having a second cross-sectional area (A2), a third region located downstream of the second region having a third cross-sectional area (A3), and an outlet located downstream of the third region, wherein A2>A1, and wherein a minimum cross-sectional area (Amin) of the internal flow path between the inlet and the outlet satisfies the relationship Amin≈A1≈A3;
a high-pressure manifold fluidically connected to the internal flow path at the second cross-sectional area (A2);
a first low-pressure manifold fluidically connected to the internal flow path, wherein the first low-pressure manifold is located at or adjacent to a perimeter of the first cross-sectional area (A1);
a second low-pressure manifold fluidically connected to the internal flow path, wherein the second low-pressure manifold is located at or adjacent to a perimeter of the third cross-sectional area (A3);
a first transducer operatively connected to the high-pressure manifold and to at least one of the first low-pressure manifold and the second low-pressure manifold, the first transducer configured to sense a pressure differential;
a damper positioned in the internal flow path; and
a controller operatively coupled to the first transducer and the damper, the controller configured to regulate a position of the damper in response to the sensed pressure differential to control volumetric flow.

26. The fluid flow assembly of claim 25, wherein the first transducer is operatively connected to both the first and second low-pressure manifolds.

27. The fluid flow assembly of claim 25 and further comprising:
a second transducer operatively connected to the high-pressure manifold and to the second low-pressure manifold, the second transducer configured to sense a pressure differential, and wherein the first transducer is operatively connected to the first low-pressure manifold.

* * * * *